United States Patent [19]
Sisley et al.

[11] Patent Number: 5,467,268
[45] Date of Patent: Nov. 14, 1995

[54] METHOD FOR RESOURCE ASSIGNMENT AND SCHEDULING

[75] Inventors: Elizabeth M. Sisley, Woodbury, Minn.; John E. Collins, Hudson, Wis.

[73] Assignee: Minnesota Mining and Manufacturing Company, St. Paul, Minn.

[21] Appl. No.: 201,664

[22] Filed: Feb. 25, 1994

[51] Int. Cl.$^6$ .................................................. G06F 19/00
[52] U.S. Cl. ............................................................ 364/401
[58] Field of Search ........................... 364/403, 402, 364/401, 424.02, 436; 395/913, 925, 926

[56] References Cited

U.S. PATENT DOCUMENTS

| | | |
|---|---|---|
| 4,092,718 | 5/1978 | Wendt . |
| 4,212,069 | 7/1980 | Baumann . |
| 4,799,162 | 1/1989 | Shinkawa et al. . |
| 4,937,743 | 6/1990 | Rassman et al. ................. 364/401 |
| 5,099,431 | 3/1992 | Natarajan ......................... 364/468 |
| 5,122,959 | 6/1992 | Nathanson et al. . |
| 5,177,684 | 1/1993 | Harker et al. .................... 364/436 |
| 5,241,465 | 8/1993 | Oba et al. ......................... 364/401 |
| 5,255,181 | 10/1993 | Chapman et al. ............... 364/401 |
| 5,295,065 | 3/1994 | Chapman et al. ............... 364/401 |
| 5,325,292 | 6/1994 | Crockett .......................... 364/401 |

OTHER PUBLICATIONS

A. V. Hill and D. C. Whybark, "Chexpedite: A Computer–Based Approach to the Bank Courier Problem," *Decision Sciences*, vol. 13, No. 2, Apr. 1982, pp. 251–265.
M. S. Fox and S. F. Smith, "ISIS—a knowledge–based system for factory scheduling," *Expert Systems*, vol. 1, No. 1, 1984, pp. 25–49.
A. V. Hill and D. C. Whybark, "Comparing Exact Solution Procedures for the Multi–Vehicle Routing Problem," *The Logistics and Transportation Review*, vol. 12, No. 3, 1976, pp. 145–153.
T. Dean and M. Boddy, "An Analysis of Time–Dependent Planning," in Proceedings of the Seventh National Conference on Artificial Intelligence, A.A.A.I., 1988, pp. 49–54.
H. Berliner and G. Goetsch, "A Study of Search Methods: The Effect of Constraint Satisfaction and Adventurousness," in Proceedings of the Ninth International Joint Conference on Artificial Intelligence, vol. 2, Aug. 18–23, 1985, pp. 1079–1082.
A. V. Hill, J. D. Naumann, and N. L. Chervany, "SCAT and SPAT: Large–Scale Computer–Based Optimization Systems for the Personnel Assignment Problem", *Decision Sciences*, vol. 14, No. 2, Apr. 1983, pp. 207–220.
B. Kalantari, A. V. Hill, and S. R. Arora, "An algorithm for the traveling salesman problem with pickup and delivery customers," *European Journal of Operational Research*, vol. 22, No. 3, Dec. 1985, pp. 377–386.
A. V. Hill, "An Experimental Comparison of Dispatching (List continued on next page.)

Primary Examiner—Donald E. McElheny, Jr.
Attorney, Agent, or Firm—Gary L. Griswold; Walter N. Kirn; Steven J. Shumaker

[57] ABSTRACT

A system and method for assigning and scheduling resource requests to resource providers use a modified "best-first" search technique that combines optimization, artificial intelligence, and constraint-processing to arrive at near-optimal assignment and scheduling solutions. In response to changes in a dynamic resource environment, potential changes to an existing assignment set are evaluated in a search for a better solution. New calls are assigned and scheduled as they are received, and the assignment set is readjusted as the field service environment changes, resulting in global optimization. Each search operation is in response to either an incremental change to the assignment set such as adding a new resource request, removing a pending resource request, reassigning a pending resource request, or to a request for further evaluation. Thus, the search technique assumes that the existing assignment set is already optimized, and limits the task only to evaluating the effects of the incremental change. In addition, each search operation produces a complete assignment and scheduling solution. Consequently, the search can be terminated to accept the best solution generated so far, making the technique an "anytime" search.

52 Claims, 7 Drawing Sheets

OTHER PUBLICATIONS

Rules for Field Service Support," *Decision Sciences*, vol. 23, No. 1, Winter 1992, pp. 235–249.

D. Whitley, T. Starkweather, and D. Shaner, "The Traveling Salesman and Sequence Scheduling: Quality Solutions Using Genetic Edge Recombination," *Handbook of Genetic Algorithms*, Chapter 22, 1991, pp. 350–372.

M. Zweben, M. Deale, and R. Gargan, "Anytime Rescheduling," in Proceedings of a Workshop on Innovative Approaches to Planning, Scheduling and Control, San Diego, California, Nov. 5–8, 1990, pp. 251–259.

A. V. Hill, V. A. Mabert, and D. W. Montgomery, "A Decision Support System for the Courier Vehicle Scheduling Problem," *OMEGA Int. J. of Mgmt Sci.*, vol. 16, No. 4, 1988, pp. 333–345.

H. Prade, "Using Fuzzy Set Theory in a Scheduling Problem: A Case Study," *Fuzzy Sets and Systems*, vol. 2, No. 2, 1979, pp. 153–165.

M. S. Fox, N. Sadeh and C. Baykan, "Constrained Heuristic Search," in Proceedings of the Eleventh International Joint Conference on Artificial Intelligence (IJCAI), Detroit, Michigan, vol. 1, Aug. 20–25, 1989, pp. 309–315.

W. Chiang and M. S. Fox, "Protection Against Uncertainty in a Deterministic Schedule," in Proceedings of the Fourth International Conference on Expert Systems in Production and Operations Management, Hilton Head, South Carolina, May 1990, pp. 184–196.

M. Zweben, "Constraint-Based Simulated Annealing: An Iterative Improvement Framework for Constraint Satisfaction Search," NASA Ames Research Center, Moffett Field, California, Aug. 9, 1990, pp. 1–13.

R. Hublou, "Manufacturing Operations Scheduling," *Business Intelligence Program Report D90–1436*, SRI International, May 1990, pp. 1–39.

A. V. Hill, "An Experimental Comparison of Human Schedulers and Heuristic Algorithms for the Traveling Salesman Problem," *Journal of Operations Management*, vol. 2, No. 4, Aug. 1982, pp. 215–223.

P. Prosser, "A Reactive Scheduling Agent," in Proceedings of the Eleventh International Joint Conference on Artificial Intelligence, Detroit, Michigan, Aug. 20–25, 1989, pp. 1004–1009.

E. Ghalichi and J. Collins, "The Dispatch Advisor," in Proceedings of the Workshop on Artificial Intelligence for Customer Service and Support, Eighth IEEE Conference on Artificial Intelligence Applications, Monterey, California, Mar. 3, 1992, pp. 60–68.

J. E. Collins and E. M. Sisley, "AI in Field Service: The Dispatch Advisor," in Working Notes, AI in Service and Support: Bridging the Gap Between Research and Applications, Eleventh National Conference on Artificial Intelligence, Washington, D.C., Jul. 11–15, 1993, pp. 26–37.

J. Tsitsiklis, "Special Cases of Traveling Salesman and Repairman Problems with Time Windows," Report LIDS–P–1987, Massachusetts Institute of Technology, Jun. 1990, pp. 1–23.

S. F. Smith, "The OPIS Framework for Modeling Manufacturing Systems," Tech Report CMU–RI–TR–89–30, Carnegie–Mellon University, Dec. 1989, pp. 1–56.

D. L. Haugen, "A Study of Scheduling and Quality of Field–Service Support Systems," Ph.D. Thesis, University of Minnesota, Nov. 1993, pp. 1–251.

METHOD FOR RESOURCE ASSIGNMENT AND SCHEDULING

FIELD OF THE INVENTION

The present invention relates to resource management, and, more particularly, to techniques for the assignment and scheduling of resource requests among a group of resource providers.

DISCUSSION OF RELATED ART

Resource assignment and scheduling problems exist in many organizations such as, for example, those involved in service or manufacturing activities. In the abstract, the assignment and scheduling problem requires the assignment of resource requests to appropriate resource providers, and the scheduling of the resource requests at particular times. Techniques for solving the assignment and scheduling problem must consider various factors including the types of resources required by particular resource requests, the types of resources available from individual resource providers, previous assignments of pending resource requests, and the scheduled times and durations of the pending resource requests.

One example of an assignment and scheduling problem arises in the context of a field service environment. A field service environment exists in many organizations, characterized by a group of field service technicians dedicated to the repair and maintenance of a variety of industrial machines, office equipment, and the like. The field service technician travels to the customer's location to perform preventative maintenance and to provide repair services pursuant to customer service calls. Thus, in the field service environment, the technicians function as resource providers, providing maintenance and repair services, and both customer service calls and preventative maintenance appointments serve as resource requests.

When a customer calls to report a problem, a human service call taker creates a call order in a database software application called a Service Management System (SMS). The SMS also may generate call orders automatically for periodic preventative maintenance appointments. The call taker adds details to the call order concerning the customer, the machine, the contract, and any symptoms the customer can provide, and then transmits the call information to a human service call dispatcher via a computer terminal or a printed call order slip. The service call dispatcher is then responsible for assigning the service call to an individual service technician, and scheduling the call among the other calls assigned to the technician. To issue assignment and scheduling decisions, the human service call dispatcher relies on either individual judgment, or one of a number of automated assignment and scheduling techniques.

In the absence of automated techniques, the human dispatcher manually posts slips of paper on a large magnetic board to indicate present assignment and scheduling decisions. With reference to the magnetic board, the dispatcher determines which technicians should be assigned a new service call based on various considerations including the characteristics of the call, the customer's contract requirements, the dynamic call load among the technicians, and available technician resources. The dispatcher places the new service call in an area of the magnetic board marked "pending" for a particular technician who the dispatcher considers most likely to take the call. When the technician telephones the dispatching center, the dispatcher simply views the magnetic board and reads one or more calls from the "pending" area. If the technician agrees to accept assignment of the calls, the dispatcher moves them to an area marked "committed."

Unfortunately, the manual dispatching technique suffers from several disadvantages. First, because the pace of the dispatcher's work varies from slow to hectic, usually with a bimodal distribution, the dispatcher's planning tends to be poorest during periods of hectic activity. Although the efficiency of the assignments made during this time suffers, the dispatcher is unlikely to reevaluate the assignments and modify them later during a slow interval. Second, the dispatchers tend to make most decisions based on a small set of heuristics. The combinatorics of the planning problem limit the extent of the human dispatcher's evaluation, effectively preventing the dispatcher from consistently finding the best solutions. Third, the only way to get an overview of the field situation in terms of loading of technicians and commitments made to customers is to look at the board in the dispatching center. Consequently, this information is not readily available to the technicians and managers in the field. Without such information, the technicians and managers are unable to contribute any valuable input to the dispatcher's planning problem.

A number of automated assignment and scheduling techniques have been developed to improve or replace the decisionmaking function of the human dispatcher. Existing automated assignment and scheduling techniques include, for example, the "primary technician" approach of automatically assigning service calls to technicians designated as primary technicians for particular customer accounts, the "one-call-at-a-time" approach of automatically assigning one of a plurality of new calls to an available technician based on an objective function, and a pure mathematical optimization approach of evaluating virtually all feasible assignment and scheduling combinations for a predetermined set of calls according to an objective function.

Many commercial SMS systems employ the "primary technician" technique, simply assigning each call automatically to the technician listed as the primary technician for the particular contract. The dispatcher or another user of the SMS may decide whether the assignment of the call to the primary technician is reasonable, and may ask for alternative technicians if the assignment is unreasonable. The alternative technicians generally are limited, however, only to secondary and tertiary technicians pre-assigned to the account. A problem associated with this simple "primary technician" dispatching approach is the automatic assignment of calls to a primary technician without regard to either the technician's backlog or rational travel planning. In addition, the "primary technician" approach provides no scheduling or travel planning assistance to the dispatcher. Rather, if customer arrival time commitments are required, the dispatcher must make them manually. In summary, this technique forces the field service organization to employ a customer-representative service model, even when this approach is inappropriate or inefficient.

Some field service organizations use systems that employ "one-call-at-a-time" dispatching rules for automated dispatching. Such a system employs a mathematical optimization technique that typically considers all unassigned service calls within a certain territory at a time when a technician becomes available, and chooses the "best" call for assignment to the technician based on an objective function. The objective function considers various factors such as response time, travel time, urgency of the service call, and any prior relationship of the technician and the customer. This technique may improve dispatching productivity in some cases and may achieve better performance than manual methods, but it also has a number of problems.

One major problem is that the mathematical optimization performed by the "one-call-at-a-time" dispatching technique is local, not global. The assignment and scheduling of a new service call is thus carried out by optimizing the placement of the new call among a fixed set of previously assigned, static calls. A second shortcoming is that all new service calls are placed in a "pool" of unassigned calls until they are dispatched, making it extremely difficult to make reliable time commitments to the customer at the time the call is received. Finally, if service territory coverage is not closely managed, technicians often "migrate" across the service landscape as the day proceeds because the "one-call-at-a-time" scheme lacks the ability to anticipate future needs. As a result, technicians may end a service day very far from their original territories.

Other mathematical optimization techniques evaluate all feasible assignment and scheduling combinations for a set of service calls already received, and return the best solution. Thus, such techniques run on a predetermined set of service calls, and fail to provide dynamic assignment and scheduling features for new calls received as the work day progresses. This shortcoming forces the human service call dispatcher to resort to the manual technique for the assignment and scheduling of new calls. Moreover, both the assignment and scheduling components of the problem are NP-hard, meaning that the complexity of the problem grows at least exponentially with the size of the problem. In large organizations, problem size is typically measured in terms of hundreds of resource providers and thousands of resource requests per day. Therefore, the size of some assignment and scheduling problems severely limits the application of such optimization techniques. Due to the combinatorial complexity of the problem, a complete "run" of the optimization technique often requires several hours of processing time. This complexity renders the pure optimization techniques too slow for practical use.

SUMMARY OF THE INVENTION

In view of the shortcomings of existing resource assignment and scheduling techniques, the present invention is directed to a system and method for assigning and scheduling resource requests with increased speed, flexibility, and reliability.

As will be described herein, the system and method of the present invention realize better customer satisfaction by improving the timeliness and predictability of resource delivery, increase dispatcher productivity by generating automated assignment and scheduling recommendations, increase resource provider productivity by reducing travel time and generally improving utilization of active time, and enhance flexibility by supporting a variety of organizational policy options to better serve diverse resource domains.

Additional features and advantages of the invention will be set forth in part in the description that follows, and in part will be apparent from the description, or may be learned by practice of the invention. The advantages of the invention will be realized and attained by the system and method particularly pointed out in the written description and claims hereof, as well as in the appended drawings.

To achieve the foregoing advantages, as broadly embodied and described herein, the present invention provides a system and method that apply a combination of optimization, artificial intelligence (AI) search, and constraint-processing techniques in a dynamic resource environment to achieve near-optimal assignment and scheduling solutions, while avoiding the combinatorial explosion inherent in existing optimization techniques. In particular, the present invention provides a system and method for assigning a plurality of resource requests among a plurality of resource providers, wherein the plurality of resource requests includes a plurality of pending resource requests assigned among the resource providers according to an existing assignment set, and wherein the existing assignment set defines a root node of a search tree. According to the system and method of the present invention, the root node is expanded by forming one or more next-level nodes, each of the next-level nodes corresponding to the root node but being further defined by a reassignment of one of the pending resource requests between one of the resource providers and another of the resource providers. A stress value is estimated for each of the next-level nodes, wherein the stress value represents a degree of undesirability of the respective reassignment, and a new assignment set is generated corresponding to one of the next-level nodes having a minimum stress value.

It is to be understood that both the foregoing general description and the following detailed description are exemplary and explanatory only, and not restrictive of the invention, as claimed.

The accompanying drawings are included to provide a further understanding of the invention and are incorporated in and constitute a part of this specification. The drawings illustrate exemplary embodiments of the invention and together with the description serve to explain the principles of the invention.

DETAILED DESCRIPTION OF THE PREFERRED EMBODIMENTS

Reference will now be made in detail to exemplary embodiments of the invention. One skilled in the art, given the description herein, will recognize the utility of the system and method of the present invention in a variety of diverse resource environments in which assignment and scheduling problems exist. For example, it is conceivable that the system and method of the present invention may be adapted for assignment and scheduling problems existent in telecommunications systems, transportation dispatching organizations, and emergency services dispatching organizations. However, for ease of description, as well as for purposes of illustration, the present invention will be described in the context of a field service environment.

Figure 1:
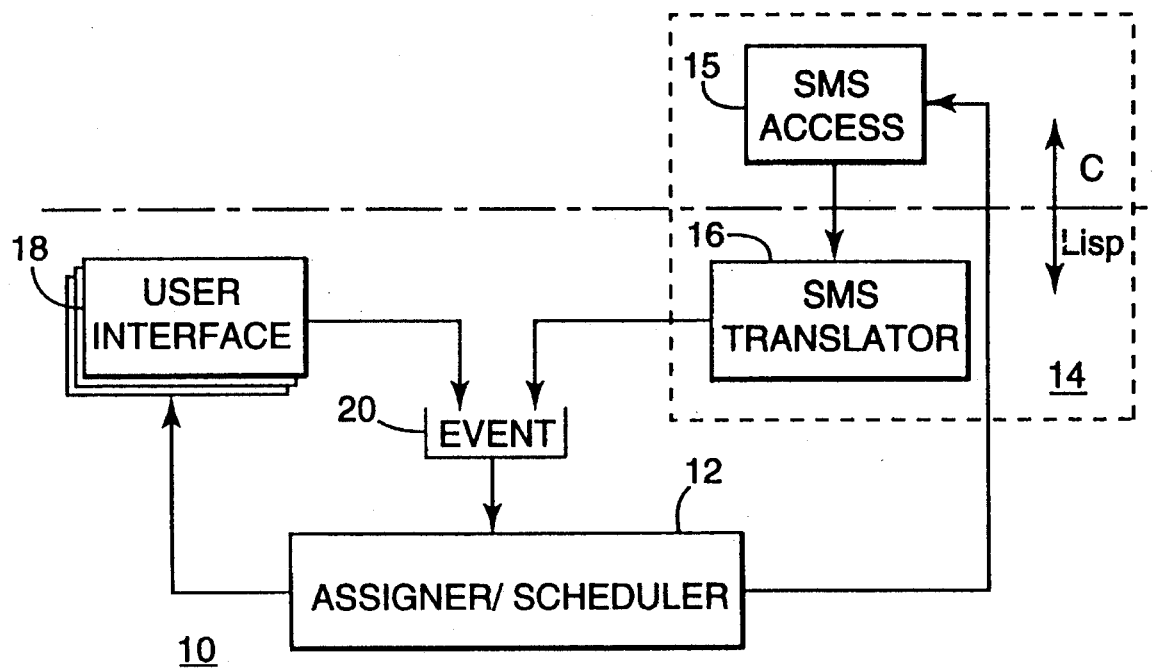
FIG. 1 is a functional block diagram of a computer-implemented software process structure incorporating a system for assigning and scheduling resource requests in accordance with the present invention.

The system and method of the present invention will be described together herein, with the method contemplated as being implemented as a series of operations performed by the system. FIG. 1 is a functional block diagram of a computer-implemented software process structure 10 configured for application in a field service environment as described above. The software process structure 10 incorporates a system 12 for the assignment and scheduling of service calls in accordance with the present invention. Assignment/scheduling (A/S) system 12 is a software system realized, for example, by a software process running on a standard Unix™ workstation. The A/S system 12, which may be implemented using the Common Lisp Object System (CLOS), is designed to run as a back-end processor for an existing SMS (not shown). The software process structure 10 further comprises an SMS interface 14 having an SMS access process 15 for communication with the SMS, and an SMS translator 16 for communication between A/S system 12 and the SMS, and one or more interactive user interfaces 18 for communication between A/S system 12 and system users. Examples of commercially available SMS systems suitable for use with software process structure 10 are the S2000™ system manufactured by Service Systems International, and the OPEN UPTIME™ system manufactured by Metrix.

The A/S system 12 searches for assignment and scheduling solutions in response to incremental changes in the dynamic field service environment, and returns the best solutions to system users as recommendations. For purposes of this description, the field service environment is characterized by three basic representational sets having dynamic attributes subject to change over time. The three sets are a technician set defined by a plurality of field service technicians operating in the field service environment, a call set defined by a plurality of customer service calls requiring repair services, and an assignment set defined by a plurality of assignments of calls to technicians. The assignment set includes a schedule set further defined by schedules of the calls assigned to each individual technician. In operation, the A/S system 12 generates assignment and scheduling recommendations, representing modifications of the assignment set, in response to changes in the dynamic attributes of the technician and call sets.

The attributes for each of the technicians in the technician set include a set of skills indicating particular machine models for which the technician is qualified to provide repair services, a primary service territory within which it is preferred that the technician operate, and a technician calendar. The technician calendar indicates times at which the technician will be unavailable due to vacation, sick days, or other appointments, and is updated by system users.

The attributes for each of the service calls in the call set include the machine model for which repair services are requested, the location of the machine, an initiation time representing the time the call was received from the customer, an expiration time representing a time beyond which the call is to be considered tardy if a technician has not arrived, a level of time commitment representing whether the customer has been promised a definite service time, a technician commitment indicating a particular technician to whom the call is to be assigned, a priority of the call relative to other pending service calls, and a call status indicating whether a call has been completed.

The attributes for each of the assignments in the assignment set include an identification of a technician and the service call assigned to the respective technician. The schedule set also provides schedule-related attributes for each assignment, including a start time and a completion time for each call, a travel time indicating an estimated duration for the technician's travel between locations associated with consecutively scheduled calls, and a call duration indicating an estimated duration for an on-site repair.

The A/S system 12 receives changes to the call and technician sets in the form of events. Two sources of events trigger the assignment and scheduling activity of A/S system 12. The SMS access process 15 captures SMS event data from the SMS database, and the user interfaces 18 receive field event data from system users. The SMS event data represent incremental changes to the call set, such as the addition of a new call, a call cancellation, and a change to call attributes. The field event data represent changes to both the technician and call sets, as entered by system users in response to changes in the field. The field event data generally result from notification by technicians or other field personnel, and include a change in call attributes or a change in technician attributes. Another type of field event data is a request for further evaluation of the prevailing assignment and scheduling recommendation for a particular technician, which may be entered by the system user.

The SMS translator 16 receives the SMS event data from SMS access process 15 and translates it into SMS events for A/S system 12. The user interfaces 18 similarly translate the field event data received from system users into field events to trigger A/S system 12. The SMS interface 14 may be implemented as two software processes for graceful crash recovery. Specifically, as shown in FIG. 1, SMS access process 15 may be implemented as a C process for receiving SMS event data from the SMS, and the SMS translator 16 may be implemented as a Lisp process for translating the SMS event data into SMS events to trigger A/S system 12. Thus, if the Lisp process of the SMS translator 16 is taken down, the C process can continue to accumulate SMS event data from the SMS until recovery of the Lisp process. The user interfaces 18 may be implemented using X-windows, and preferably generate graphical displays that integrate SMS functionality and the functionality of A/S system 12. The SMS interface 14 and user interfaces 18 send the SMS and field events, respectively, to an event queue 20 associated with A/S system 12. Because the asynchronous SMS and field events both trigger assignment and scheduling activity in A/S system 12, event queue 20 is necessary to linearize the events. By queuing the events, A/S system 12 can process them one at a time without overlap so that a single coherent data structure representing the assignment set can be maintained.

Figure 2:
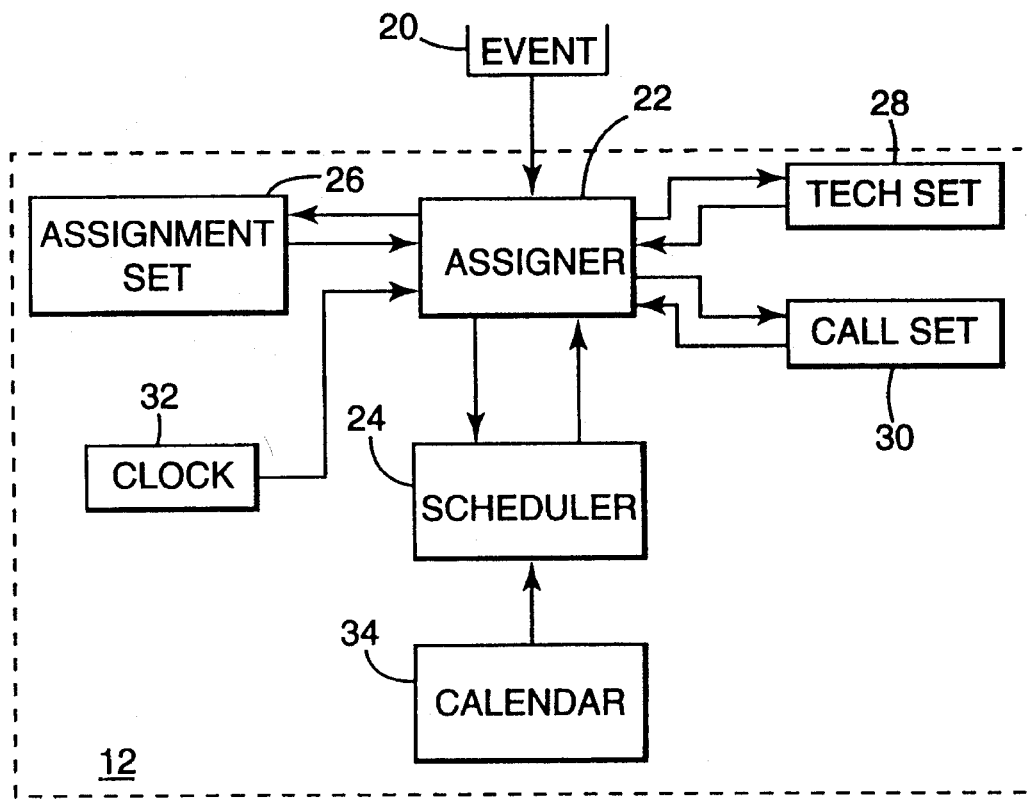
FIG. 2 is a functional block diagram of a system for assigning and scheduling resource requests in accordance with the present invention.

The structure of A/S system 12 will now be described with reference to FIG. 2. The A/S system 12 employs two software process modules that cooperate to reach an assignment set that optimizes a single objective function of the field service environment. As shown in FIG. 2, A/S system 12 comprises an assigner module 22 and a scheduler module 24. The assigner module 22 searches for potential assignments of service calls among the service technicians, and evaluates a portion of the objective function relating to the desirability of particular associations of calls and technicians. The assigner module 22 invokes scheduler module 24 to search for the best schedule among a plurality of potential schedules of the calls assigned to a particular technician, and to evaluate a portion of the objective function relating to time. Each of the potential schedules searched by scheduler module 24 represents a time-ordered sequence of the calls assigned to a technician. Thus, a complete assignment of a service call involves both an association of the call with a technician, as determined by assigner module 22, and a scheduling of the call at a particular time, as determined by the scheduler module 24.

The A/S system 12 further includes three main data structures 26, 28, 30, and a clock 32 accessed by assigner module 22. The assignment set data structure 26 stores a representation of the existing assignment set that defines an existing assignment of pending service calls among the service technicians. The assignment set data structure 26 also includes an existing schedule set that defines a schedule of the pending service calls assigned to each of the service technicians. The technician set data structure 28 stores a representation of the existing technician set that defines the attributes of the technicians operating in the field service environment. The call set data structure 30 stores a representation of the existing call set that defines the attributes of the pending service calls. The clock 32 serves as a source of real-time for use in evaluating time-related factors of an assignment. The assigner module 22 continuously updates the technician and call data structures 28, 30 to reflect changes in the field service environment as represented by the SMS and field events received by queue 20. The assigner module 22 also updates the assignment set stored in the assignment set data structure 26 to represent assignment and scheduling recommendations.

As shown in FIG. 2, the scheduler module 24 accesses a calendar data structure 34 during the scheduling operation. The calendar data structure 34 stores a representation of the working calendar of the organization operating in the field service environment. The working calendar indicates time segments potentially available for the scheduling of service calls, and may be updated according to organizational calendar changes via user interfaces 18. Each of the time segments may correspond to the length of a work day. Thus, the scheduler module 24 accesses the calendar data structure 32 to determine which time segments are available work days, and to determine scheduling boundaries between consecutive work days to avoid carrying calls over to the next day.

The search operation of A/S system 12 will now be described. In response to an SMS or field event received at queue 20, the A/S system 12 conducts a modified "best-first" search that combines optimization, artificial intelligence, and constraint-processing techniques to arrive at near-optimal assignment and scheduling recommendations. When a change to the technician or call set is received, the A/S system 12 executes a search that evaluates potential changes to the existing assignment set in an attempt to find a better distribution of calls among the technicians, as well as a better scheduling of calls assigned to individual technicians. The A/S system 12 generates assignment and scheduling recommendations for all new calls as they are received, and immediately readjusts the assignment, resulting in global optimization. However, each search operation conducted by A/S system 12 explores the effects of only an incremental change to the call set such as adding a new call, removing a pending call, or reassigning a pending call. Thus, the search technique assumes that the existing assignment set is already optimized, and limits the task only to minimizing the effects of the incremental change, thereby reducing the search space. The A/S system 12 also incorporates domain constraints into the search to further prune the search space.

With each search operation, the A/S system 12 produces a complete solution for the field service environment, i.e., all calls are assigned to technicians. Consequently, the search can be stopped at any time, taking the best solution found so far. This characteristic makes the search technique conducted by A/S system 12 an "anytime search," and enables the search to be suspended for other activity, but restarted later for improvements on the existing solution. For example, the A/S system 12 may search for better solutions in response to either a request for reevaluation by a system user, the passage of a predetermined amount of time, or simply the availability of idle processing time.

The SMS and field events received by queue 20 can be divided into the following three basic categories: a change to the call set, a change to the technician set, and a request for further evaluation. The response of the A/S system 12 to the three categories of events falls into two basic modes. The addition of a new service call initiates the first mode, called the new call event mode. The second mode is a general event mode initiated by all SMS and field events except the addition of a new service call. The new call event mode differs from the general event mode essentially in that it first requires a search for potential assignments of the new unassigned service call, followed by a search for potential reassignments of pending calls. In contrast, the general event mode only requires a search for potential reassignments of pending calls in an effort to improve the existing assignment set.

The operation of A/S system 12 in the new call event mode will be described with reference to the flow diagram shown in FIG. 3 and the search tree shown in FIG. 4. When A/S system 12 receives a new call event via queue 20, as indicated by block 40 of FIG. 3, the system 12 enters the new call event mode in which the assigner module 22 first updates the call data structure 30 by adding the new service call and the particular attributes of the new service call, and then accesses the assignment set data structure 26 to determine the existing assignment set. The assigner module 22 then creates a root node of a search tree defined by the existing assignment set and the unassigned new call, as indicated by block 42. FIG. 4 shows a simplified search tree 70 including a root node 72. The root node 72 of FIG. 4 includes, for example, three technicians A, B, and C, and four pending service calls 1, 2, 3, and 4. The root node 72 includes an assignment component 72a that is defined by assignments of pending calls 1 and 2 to technician A, the assignment of no pending calls to technician B, and the assignments of pending calls 3 and 4 to technician C. The assignment component 72a of root node 72 is not defined by an assignment of new call 5, received at queue 20. Therefore, root node 72 offers an incomplete solution for the field service environment.

Figure 3:
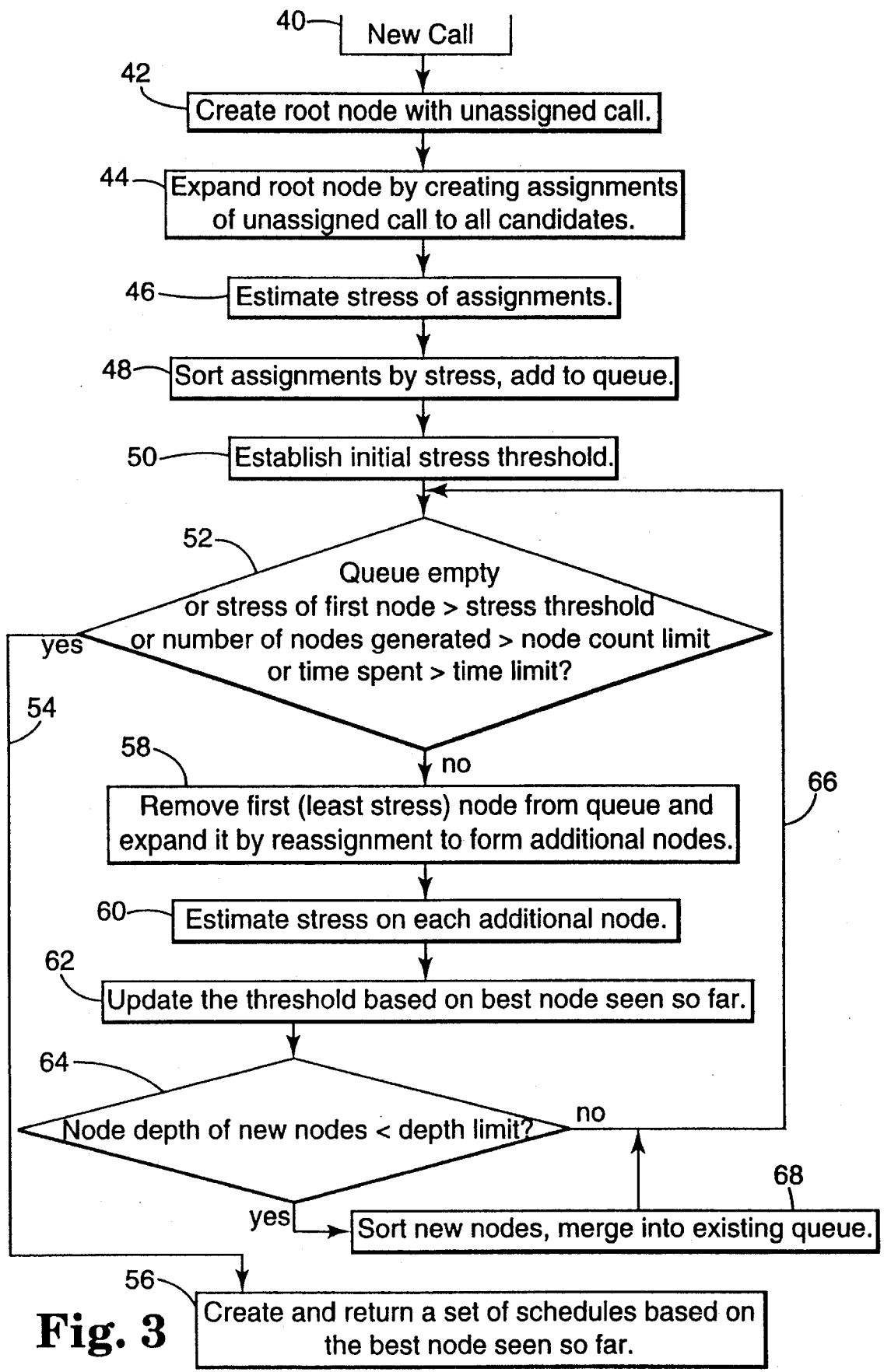
FIG. 3 is a flow diagram illustrating a first mode of a system and method for assigning and scheduling resource requests in accordance with the present invention.
Figure 4:
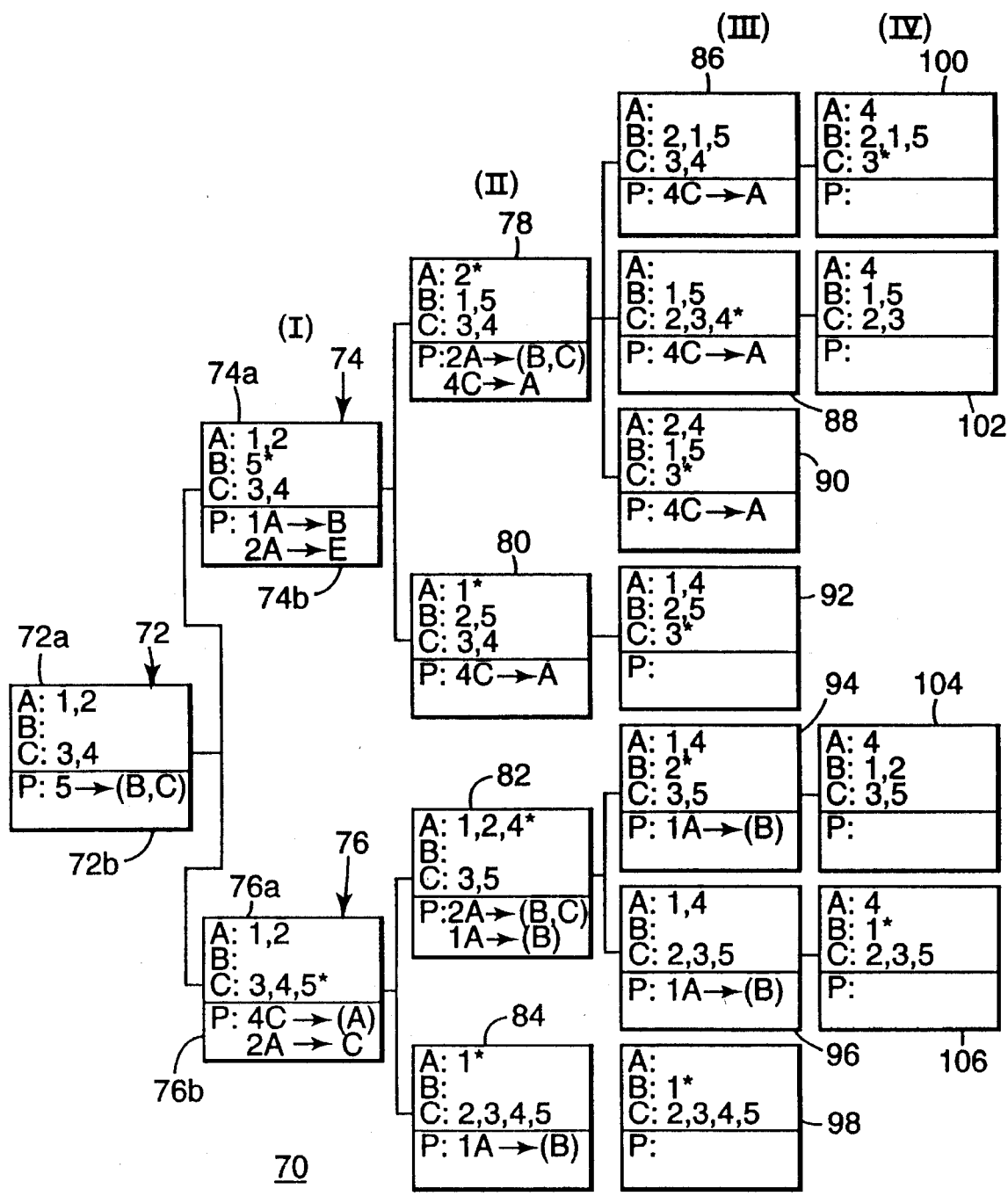
FIG. 4 is a search tree diagram illustrating the operation of the first mode shown in FIG. 3.

To generate a complete solution, the assigner module 22 expands the root node 72, as indicated by block 44 of FIG. 3, by forming one or more first-level nodes 74, 76 at a first level (I) of the search tree 70. The assigner module 22 also expands one or more of the first-level nodes 74–76 by forming a succession of next-level nodes 78–106, as will be described in greater detail later in this specification. The expansion of root node 72 to form next-level nodes 74, 76 is indicated by an expansion component 72b, which represents all potential assignments of the unassigned new call 5 to the technicians operating in the field service environment. Each of the first-level nodes 74, 76 corresponds to the root node 72, but is further defined by an assignment of the new call to one of the service technicians. The technician to whom the new call is assigned will be referred to as the "selected" technician.

In FIG. 4, first-level node 74 is defined by an assignment of new call 5 to technician B, whereas first-level node 76 is defined by the assignment of new call 5 to technician C. The assignment components 74a, 76a of the first-level nodes 74, 76 reflect these assignments. The formation of first-level nodes 74 and 76 are governed by the expansion component 72b of root node 72. To expand the root node 72, the assigner module 22 first generates a list of the service technicians qualified to accept assignment of the new service call. The expansion component 72b is defined by this list. The technicians on the list are designated as candidate technicians for the new service call. Each of the candidate technicians qualified to accept assignment of the new service call has either a service territory, a skill level, or both appropriate for the new service call, as determined by the requirements of the service organization. The assigner module 22 determines the service territory and skill level of each of the technicians in the technician set by accessing the technician data structure 28, and determines whether such attributes are compatible with the attributes of the new service call.

As an illustration, if new service call 5 requires repair of machine model A, at location X, an organization may require that it be assigned to a service technician having the necessary skills to repair machine model A, who also operates in a service territory within an acceptable travel time of location X. Based on the candidate list, each of the first-level nodes 74, 76 formed by the assigner module 22 corresponds to the root node 72 but is further defined by an assignment of the new service call to a selected one of the candidate service technicians only. Therefore, with reference to the simplified root node 72, if technicians B and C are qualified to accept assignment of new call 5, but technician A is not, the result is the first-level nodes 74, 76 shown in FIG. 4. The expansion component 72b represents all potential assignments of new call 5 to candidate technicians, as determined by the candidate list. Specifically, expansion component 72b indicates the assignment of new call 5 to either candidate technician B or candidate technician C by the representation P: 5→(B, C), where P represents potential assignments of new call 5. Although only two first-level nodes 74, 76 are shown with reference to the simplified root node 72 shown in FIG. 4, the assigner module 22 forms a first-level node for each and every potential assignment of the new service call to a candidate service technician. Thus, the size of the technician and call sets may greatly increase the number of potential assignments of the new service call, and hence the number of first-level nodes.

After the assigner module 22 has formed one of the first-level nodes 74, 76, it next estimates a stress value representing a degree of undesirability of the respective assignment of the new service call, as indicated by block 46 of FIG. 3. The A/S system 12 seeks to minimize the total stress of all assignments in the field service environment. Because the existing assignment set is assumed to be already more or less optimized, however, it is only necessary to estimate the incremental stress caused to the field service environment by the assignment of the new call, relative to the stress of the root node 72. Thus, the stress value of the root node 72 can be assumed to be zero. The incremental stress of the field service environment is merely the incremental stress to the particular technician affected by the assignment. Estimation of the stress value by the assigner module 22 involves activation of the scheduler module 24 and will be described in greater detail later in this specification.

The assigner module 22 next sorts the first-level nodes 74, 76 by stress value, and adds them to a search queue for further expansion, as indicated by block 48. The first-level node having a minimum stress value is selected as the "least-stress" node, and is placed first in the search queue. The assigner module 22 then calculates an initial stress threshold based on the minimum stress value, as indicated by block 50. The stress threshold constitutes the sum of the minimum stress value and a user-definable stress margin. This stress threshold is maintained throughout the search until a lower-stress node is generated, at which time the stress threshold is recalculated. The assigner module 22 selects the first node in the search queue for the next expansion, in accordance with the "best-first" characteristic of the search technique which dictates that least-stress nodes be explored first, and executes the next expansion by forming one or more of the next-level nodes 78–84 shown in search tree 70.

Before further expansion, however, the assigner module 22 first determines whether certain search terminating conditions have been satisfied, as indicated by block 52 of FIG. 3. The assigner module 22 expands the first node in the search queue only if the conditions are not satisfied. Although it is unlikely in the real world that the terminating conditions will occur at the first level (I) of the search tree, the assigner module 22 nevertheless checks the conditions at each level of the search. Specifically, the assigner module 22 terminates the search if either the search queue is empty, the stress value of the first, least-stress node is greater than the prevailing stress threshold, the number of nodes generated is greater than a predetermined node count limit, or processing time has exceeded a predetermined time limit. If any of the terminating conditions is met, the assigner module 22 terminates the search and creates an assignment set corresponding to the best node produced so far, as indicated by branch 54 and block 56 of FIG. 3, and returns the assignment set to a system user as a recommendation.

In the exemplary search tree 70 of FIG. 4, it is clear that the search queue is not empty at the first level, in view of the presence of first-level nodes 74 and 76. In fact, the occurrence of an empty search queue is a rare occurrence at any level in a real world field service environment because the boundaries of the technicians' individual service territories typically overlap such that changes in the technician and call sets can in principle propagate across the entire service territory. As the search progresses, however, there is a possibility that the number of potential next-level nodes may be exhausted, resulting in an empty search queue. Each of the next-level nodes 78–84 corresponds to the respective one of the first-level nodes 74, 76 from which it stems, but is further defined by a reassignment of one of the pending service calls between the selected one of the service technicians, i.e., the service technician to whom the new service call was assigned in the first-level node, and another of the candidate service technicians. Thus, the empty search queue condition occurs only when next-level nodes have been formed for every possible combination of reassignments of the pending service calls between candidate technicians for the respective calls.

Because the search technique is an "anytime" search, the assigner module 22 may terminate the search at any point beyond the root node 72, without affecting the completeness of the assignment and scheduling solution. This "anytime" feature enables the assigner module to apply the other terminating conditions shown in block 52 of FIG. 3. For example, the assigner module 22 expands the first node in the search queue only if it satisfies the prevailing stress threshold. At the first level of the search tree, at least one node will satisfy the stress threshold. Specifically, the stress threshold is equivalent to the stress value of the least-stress, first-level node plus the stress margin. Thus, the least-stress first-level node clearly will be less than the stress threshold. The stress value of the least-stress first-level node serves as a benchmark for the remaining nodes, thereby limiting the search space. The assigner module 22 does not even consider further expansion of first-level nodes that exceed the stress threshold. However, it is possible that first-level nodes that exceed the stress value of the least-stress node may later produce next-level nodes having lower stress values. Therefore, the value of the user-definable stress margin should be large enough to accommodate the "lumpiness" of the search space, as determined empirically by monitoring the actual field service environment over time, but small enough to avoid wasting time on unproductive expansions.

The node count limit and time limit terminating conditions shown in block 52 provide maximum search constraints designed to further prune the search space. The node count limit specifies a maximum number of nodes that can be generated before the assigner module 22 terminates the search. The time limit defines a maximum elapsed processing time allotted for any single search. The node count limit and time limit conditions work particularly well in practice because the assigner module 22 tends to generate its least-stress nodes early in the search. The early generation of low-stress nodes results not only from the modified best-first approach of the search technique, but also because continued expansion of the search tree generally corresponds to "geographic spread" of the calls.

If the terminating conditions indicated in block 52 are not satisfied, the assigner module 22 removes the first, first-level node from the search queue for further expansion. Assuming that first-level node 74 is the first node in the search queue, the assigner module 22 expands it, as indicated in block 58, by forming one or more next-level nodes 78, 80 at the next level (II) of the search tree 70. Each of the next-level nodes 78, 80 corresponds to first-level nodes 74, from which it stems, but is further defined by a reassignment of one of the pending service calls between the selected one of the service technicians, i.e., technician B to whom new service call 5 was assigned in first-level node 74, and another of the service technicians A, C. Unlike the pending service calls, the new service call 5 is not reassigned during expansion, but rather remains assigned to the selected technician B as in first-level node 74.

In addition, the assigner module 22 does not simply rearrange the existing assignments of pending calls to technicians other than the selected technician, because the assignment of the new call would have no effect on such assignments. Rather, the assigner module 22 propagates changes from one technician to another technician affected by the change. For example, the two nodes

| A: | 1       | and | A: | 1, 4 |
| B: | 5       |     | B: | 5    |
| C: | 2, 3, 4 |     | C: | 2, 3 |
| P: | 4C -> A |     | P: |      | do not appear in the search tree 70 because they are defined by simple rearrangements of pending calls unaffected by the assignment of new call 5. Specifically, because new call 5 was assigned to technician B in first-level node 74, it has no effect on the existing stress estimations for the pending calls assigned to technicians A and C. Therefore, next-level nodes 78, 80 propagate the change caused by the addition of new call 5 by reassignment to and from the selected technician B at the second level (II) of the search tree 70.

For expansion of a first-level node, as in the expansion of root node 72, the assigner module 22 first generates, for each of the pending service calls, the list of candidate service technicians qualified to accept reassignment of the respective service call. Such a list would govern, for example, the expansion component 74b of first-level node 74. As in the expansion of the root node 72, the technicians qualify as candidate technicians for a pending service call based on an appropriate service territory or skill level, as determined by reference to the technician attributes stored in the technician data structure 28, as well as to the attributes of the pending call stored in the call set data structure 30.

The expansion of a first-level node by assigner module 22 comprises two types of attempted expansions, an "out-expansion" and an "in-expansion," each of which involves a reassignment of a pending call. The expansion component of a first-level node 74, 76 is defined by all potential out-expansions and in-expansions for the selected technician. The out-expansion comprises the formation of one or more next-level nodes that correspond to the first-level node, but which are further defined by a reassignment of one of the pending calls assigned to the selected technician, i.e., the technician to whom the new service call was assigned in the first-level node, to another of the service technicians who qualifies as a candidate technician for the respective pending call. Out-expansions are represented in FIG. 4 as cF→(T), where c is the pending call number, F is the technician from whom the pending call is reassigned, and T is the technician to whom the call is reassigned.

Each out-expansion involves reassignment of a call from the selected technician to another technician. Assuming that first-level node 76 is the first, least-stress node in the search queue, an example of a next-level node formed by out-expansion is next-level node 82, shown in FIG. 4. Next-level node 82 is the result of an expansion of first-level node 76, which is defined by the assignment of pending calls 1 and 2 to technician A, the assignment of no pending calls to technician B, and the assignment of pending calls 3 and 4 and new call 5 to technician C. Next-level node 82 corresponds to first-level node 76 but is further defined by the reassignment of pending call 4 from technician C, the selected technician to whom new call 5 was assigned, to technician A. Thus, next-level node 82 represents a change in the existing assignment set. In FIG. 4, the expansion component 76b of first-level node 76 includes a representation of this out-expansion as P: 4C→(A).

The in-expansion performed by assigner module 22 comprises the formation of one or more next-level nodes that correspond to the respective first-level node, but which are further defined by a reassignment of one of the pending service calls to the selected service technician, i.e., the technician to whom the new service call was assigned in the first-level node, from another of the service technicians. Thus, the selected technician qualifies as a candidate technician for the respective pending call. In-expansions are represented as cF→T, where c is the pending call number, F is the technician from whom the pending call is reassigned, and T is the technician to whom the pending call is to be reassigned.

Assuming that first-level node 74 is the first node in the search queue, examples of next-level nodes formed by in-expansion are next-level nodes 78 and 80. Next-level node 84 would represent an in-expansion of first-level node 76, provided first-level node 76 were the first node in the search queue. First-level node 74 is defined by the assignment of pending calls 1 and 2 to technician A, the assignment of new call 5 to technician B, and the assignment of pending calls 3 and 4 to technician C. As in the out-expansion operation, in-expansion of first-level node 74 does not disturb the assignment of new call 5 to the selected technician B. Rather, in-expansion results in a next-level node 78 that corresponds to first-level node 74, but which is defined by a reassignment of pending call 1 from technician A to the selected technician B. As shown in FIG. 4, the expansion component 74b of first-level node 74 represents the above in-expansion as P: 1A→B.

The assigner module 22 repeatedly invokes the in-expansion operation one or more times to form in-expanded next-level nodes defined by each possible reassignment of pending calls to the selected technician, one call at a time. Similarly, the out-expansion operation is repeatedly invoked to form out-expanded next-level nodes defined by each possible reassignment of the pending service calls assigned to the selected technician. Of course, in each repetition, the reassignment must be directed to a candidate technician for the respective pending call. It is also noted that the assigner module 22 avoids generating the same expansions for a given technician more than once, and therefore does not repeat the reassignment of a pending call on any given path from the root node 72 of search tree 70.

For each of the next-level nodes, the assigner module 22 estimates a stress value representing a degree of undesirability of the respective reassignment of the pending service call, as indicated by block 60 of FIG. 3. The technique by which the assigner module 22 estimates the stress value for each of the next-level nodes is identical to that employed for the first-level nodes, requiring activation of the scheduler module 24, and, for this reason, will be described later in the specification. As indicated by block 62, the assigner module 22 next updates the prevailing stress threshold by determining the minimum stress value of the stress values estimated for each of the next-level nodes. If one of the stress values is less than the minimum stress value determined for the first-level nodes, the assigner module 22 recalculates the stress threshold. For example, assuming that first-level node 74 previously was the least-stress node, but that next-level node 78 generated an even lower stress value, the assigner module 22 updates the stress threshold to reflect the stress value of next-level node 78 plus the user-defined stress margin. However, if none of the next-level nodes has a stress value less than that of the previous least-stress node, the stress threshold is unchanged.

The assigner module 22 limits the depth of expansion by comparing the level of the new set of next-level nodes to a depth limit, as indicated by block 64. The depth limit specifies a maximum depth of the search tree 70. The assigner module 22 does not consider next-level nodes at the depth limit for further expansion, and does not add them to the search queue. Rather, if the level of the new set of next-level nodes is equal to the depth limit, the assigner module 22 carries out the next expansion cycle by expanding only the least-stress unexpanded node already in the search queue, as indicated by loop 66. If the level of the new next-level nodes is less than the depth limit, however, the assigner module 22 sorts them by stress value and merges them into the search queue with the unexpanded nodes, as indicated by block 68. Thus, new next-level nodes at a level less than the depth limit are considered for the next expansion, as indicated by loop 66.

Before starting the next expansion cycle, the assigner module 22 first checks the terminating conditions of block 52. The first node in the search queue now represents the least-stress node of the remaining unexpanded first-level and next-level nodes. At this stage of the expansion, all next-level nodes are unexpanded. With reference to FIG. 4, for example, if first-level node 74 was the previous least-stress node, and node 74 was expanded by forming next-level nodes 78, 80, the nodes in the search queue would comprise unexpanded first-level node 76 and unexpanded next-level nodes 78 and 80. If the terminating conditions are not satisfied, the assigner module 22 starts the new expansion cycle. Specifically, as indicated by block 58, the assigner module 22 removes the first node from the search queue and again executes the expansion operation by forming one or more next-level nodes.

If the first node in the search queue is a first-level node, the assigner module forms one or more next-level nodes at the second level (II) of the search tree 70, provided the first node does not satisfy the terminating conditions. For example, assuming first-level node 74 was previously the least-stress node, resulting in the formation of next-level nodes 78 and 80, but that the stress value of unexpanded first-level node 76 is less than those of unexpanded next-level nodes 78, 80, the next expansion cycle produces next-level nodes 82 and 84 at level (II). However, if the first node in the search queue is one of the next-level nodes at the second level (II) of the search tree 70, the assigner module 22 forms one or more next-level nodes at the next level (III) of the search tree. For example, if the search queue contains next-level nodes 78 and 80, and first-level node 76, and next-level node 78 is the least-stress remaining unexpanded node, the next expansion cycle results in the formation of next-level nodes 86, 88, and 90 at level (III) of search tree 70.

Thus, in the new expansion cycle, assigner module 22 expands one of the remaining unexpanded first-level or next-level nodes to form one or more additional next-level nodes 86–98 at the next level of search tree 70. The first-level and next-level nodes form part of a preceding level of search tree 70, relative to the next cycle of next-level nodes, and therefore will be referred to as preceding-level nodes. The assigner module 22 carries out the expansion by forming, for the preceding-level node at the head of the search queue, one or more next-level nodes. Each of the next-level nodes corresponds to the respective preceding-level node, as represented in the search queue, but is further defined by another reassignment of one of the pending service calls between a technician affected by a reassignment in the preceding-level of search tree 70 and another of the technicians. Technicians "affected" by a reassignment are those technicians to whom or from whom a pending call was reassigned in the preceding-level node.

In the next expansion cycle, the next-level nodes are again formed by in-expansion or out-expansion as previously described. The expansion component for each of the next-level nodes is defined by all untried in-expansions and out-expansions for the technicians affected by the reassignment in the respective preceding-level node. The assigner module 22 runs through the stress estimation routine, stress threshold updating routine, and depth limit routines represented by blocks 60, 62, and 64 of FIG. 3, and then executes another expansion cycle, in which the remaining least-stress unexpanded node serves as the preceding-level node for additional in-expansion and out-expansion. Thus, the assigner module 22 continues to expand the search tree 70 as long as potential reassignments remain, the search continues to generate nodes having stress values satisfying the prevailing stress threshold, and the other terminating conditions of block 52 are not met. The assigner module 22 thereby forms an indefinite succession of next-level nodes, as represented by next-level nodes 78–84 at level (II), next-level nodes 86–98 at level (III), and next-level nodes 100–106 at level (IV) of search tree 80.

When the terminating conditions are satisfied, however, the assigner module 22 terminates the succession of expansion cycles, and generates a new, recommended assignment set as indicated by block 56 of FIG. 3. The new assignment set corresponds to one of the first-level nodes 74, 76 and next-level nodes 78–106 having the minimum stress value. The assigner module 22 displays a representation of at least a portion of the recommended assignment set to the system users via user interfaces 18. The assigner module 22 also updates the existing assignment set data structure 26 to reflect the new, recommended assignment set, and reports the new assignment to the SMS as an assignment transaction, provoking an update of the SMS database.

The general event mode of the assigner module 22 will now be described with reference to the flow diagram illustrated in FIG. 5. The general SMS and field events that trigger the general event mode include call cancellations, call attribute changes, technician attribute changes, and requests for further evaluation, but do not include the addition of new calls. Because the general event mode does not require the addition of a new call, the existing assignment set already provides a complete solution for the field service environment. However, the assigner module 22 searches for improvements to the complete solution in response to the changes represented by the SMS and field events. To improve the existing assignment set, the general event mode requires only a search for potential reassignments of pending calls, and thus effectively forms only next-level nodes. In many cases, however, the existing assignment set may already provide the least-stress scenario.

Figure 5:
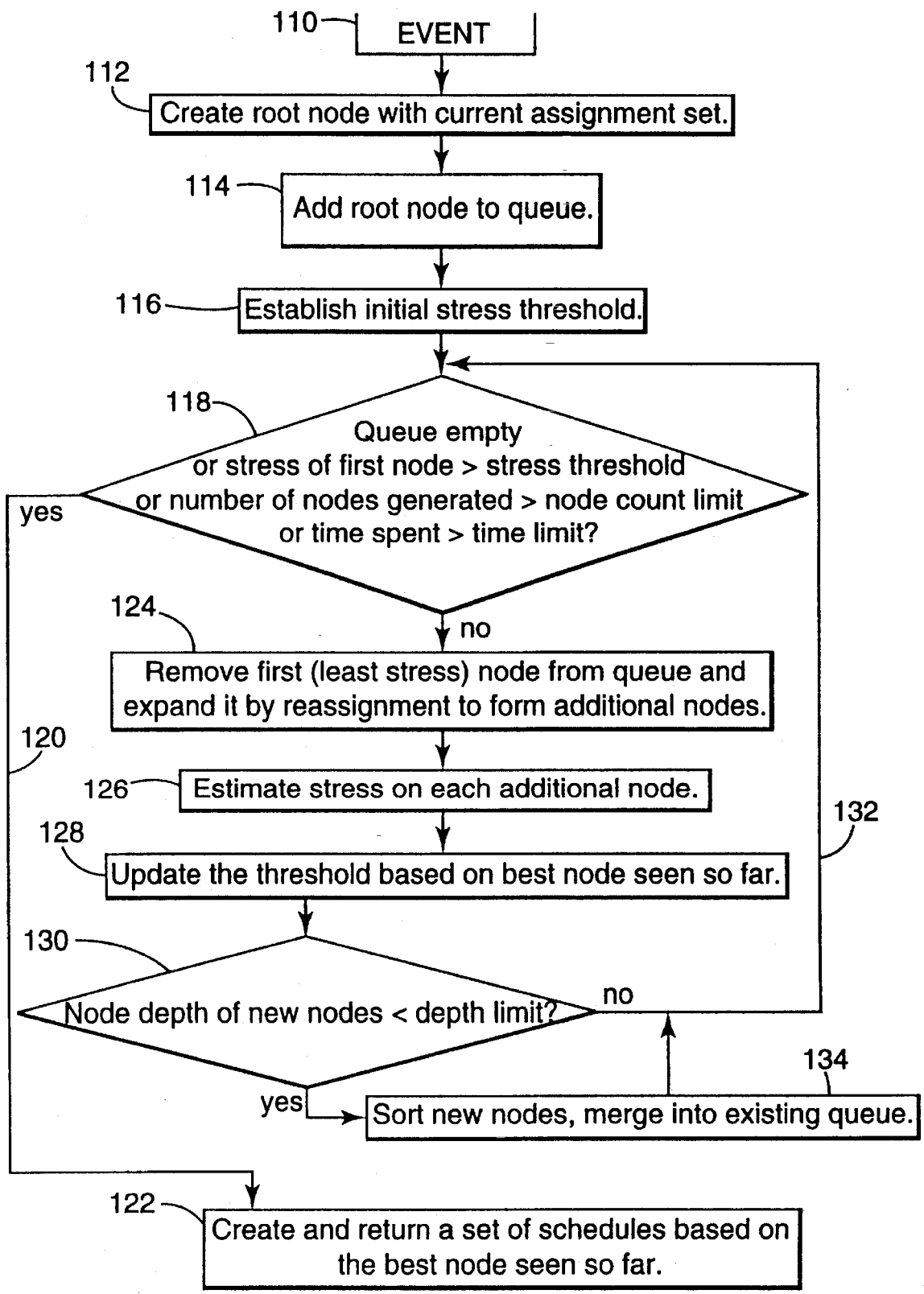
FIG. 5 is a flow diagram illustrating a second mode of a system and method for assigning and scheduling resource requests in accordance with the present invention.

In response to a general event received at queue 20, as indicated by block 110 of FIG. 5, the assigner module 22 first creates a root node defined by the existing assignment set, as indicated by block 112. The assigner module determines the existing assignment set by reference to the assignment set data structure 26. The assigner module 22 then adds the root node to the search queue, as indicated by block 114, and establishes an initial stress threshold, as indicated by block 116. The assigner module 22 assumes a stress value of zero for the root node, because the stress values of subsequent nodes are incremental stress values measured relative to the root node. Thus, the initial stress threshold simply may be the stress margin. Before executing an expansion cycle, the assigner module 22 checks the terminating conditions of block 118 which correspond to the terminating conditions applied in the new call event mode. The occurrence of one of the terminating conditions results in the termination of the search, as indicated by branch 120 and block 122. At the root level of the search tree, however, the terminating conditions of block 118 will never be satisfied.

The assigner module 22 next removes the root node from the search queue and expands it as a preceding-level node by forming one or more next-level nodes, as indicated by block 124 of FIG. 5. Each of the next-level nodes corresponds to the root node, but is further defined by a reassignment. Specifically, each of the next-level nodes is defined by the reassignment of one of the pending service calls between a selected one of the service technicians and another of the service technicians. After the initial expansion of the root node for the selected technician, the assigner module 22 forms subsequent next-level nodes by propagating potential changes along the paths of the search tree. If the general event is a call attribute change, the selected technician is the technician to whom the changed call is assigned. The changed call may itself be reassigned to more appropriate technicians. If the general event is a technician attribute change, the selected technician is the technician having the changed attributes. If the general event is a request for further evaluation, the selected technician is either one of the technicians for whom the system user requested evaluation, or one of the technicians assigned a call for which the system user requested evaluation. If the general event is the passage of a predetermined amount of time, the selected technician is determined by the status of the pending calls assigned to the technician. This feature is designed to update the assignment set according to changes in the status of service calls over time, such as the completion of a call by a service technician, or to update out-of-date recommendations. The update principally involves operation of the scheduler module 24 to update the existing schedule set. Finally, if the general event involves the cancellation of a call, the selected technician is the technician to whom the cancelled call was previously assigned. In this manner, the assigner module 22 evaluates the reassignment of calls to and from the particular technician, in view of the modified assignment load of the technician.

The next-level nodes result from either an in-expansion or an out-expansion of the root node, as described with respect to the new call event mode. Thus, the operation of the assigner module 22 in the general event mode basically corresponds to the portion of the new call event mode starting with the expansion of the first set of next-level nodes 78–84 shown in the search tree 70 of FIG. 4. After expanding the root node, the assigner module 22 estimates stress values for each of the resulting next-level nodes, representing a degree of undesirability of the reassignment of the respective service call, as indicated by block 126 of FIG. 5. Again, estimation of the stress value requires the assigner module 22 to invoke the scheduler module 24, as will be discussed. The assigner module 22 then sorts the next-level nodes by stress value, and merges the next-level nodes into the search queue, placing the node having the minimum stress value first in the search queue.

As in the new call event mode, the assigner module 22 determines whether the stress threshold should be updated. If one of the stress values of the next-level nodes is less than the minimum stress value determined for the root node, the assigner module 22 recalculates the stress threshold. The updated stress threshold then represents the sum of the minimum stress value of the next-level nodes and the stress margin. However, if none of the next-level nodes has a stress value less than that of the root node, the stress threshold is unchanged. As indicated by block 130, the assigner module 22 nexts applies the depth limit to determine whether the new set of next-level nodes should be added to the search queue. If the new nodes satisfy the depth limit, the assigner module 22 sorts them by stress value, and merges them into the search queue, as indicated by block 134. The assigner module 22 otherwise begins the next expansion without the new nodes. As indicated by loop 132, the assigner module 22 then checks the terminating conditions shown in block 118 to determine whether a new expansion should be executed. If the terminating conditions are not met, the assigner module 22 begins a new expansion cycle by removing the first one of the unexpanded next-level nodes in the search queue, and expanding it to form one or more next-level nodes, as indicated by block 124. Thus, the first node in the search queue serves as a preceding-level node for the generation of the next level of the search tree. As in the new call event mode, the assigner module 22 conducts the stress estimation and stress threshold operations of blocks 126 and 128, respectively, and continues to generate new expansion cycles, according to the "best-first" search technique, by in-expansions and out-expansions until the terminating conditions of block 118 are met. The continued expansion results in a succession of next-level nodes. Upon occurrence of one of the terminating conditions, the assigner module 22 generates a new, recommended assignment set corresponding to the node having the minimum stress value.

Estimation of the stress value by the assigner module 22 and scheduler module 24 in both the new call and general event nodes will now be described in detail. The primary goal of A/S system 12 is to minimize the total stress of all of the assignments across the entire field service environment. The assigner and scheduler modules 22, 24 accomplish this goal by minimizing the objective function $$X_n = \sum_{t \in T} \Delta X_t \quad (1)$$

where t is a subset of all of the technicians in the technician set T, and $\Delta X_t$ is the incremental stress difference of the root node and the present node under evaluation for a particular technician t. Only a subset t of all technicians needs to be considered during any single "run" of the stress estimation routine because the assignment of a new call or reassignment of a pending call, defining each node, does not affect all of the technicians. The stress $X_t$ of the assignment set on a particular technician is represented by the function $$X_t = \sum_{a \in s(t)} X_a \quad (2)$$

where the stress $X_a$, is the stress of an individual assignment a at a particular time in a schedule s(t) maintained by technician t. The assigner module 22 calculates stress value $X_a$ based on one or more of a plurality of user-definable component stress values associated with assignment a. An example of the calculation of this stress value $X_a$ is represented by the assignment stress equation $$X_a = cv + pv + tv + kv + dv + sv \quad (3)$$

where the component assignment stress values include a commitment stress value cv, a primary technician stress value pv, a territory stress value tv, a skill stress value kv, a depth stress value dv, and a schedule stress value sv. The component stress values of stress function $X_a$ represent the stress or "undesirability" of a particular assignment or reassignment. In practice, the calculation of stress value $X_a$ may be based on all of the above stress values, or any subset thereof, depending on the priorities of different service organizations. In addition, system users may assign relative weights to the component stress values to reflect the management policies of the particular service organization.

The commitment stress value cv of an assignment encourages the A/S system 12, as well as system users, to honor commitments made to customers, such as the promised assignment of a service call to a particular technician. In function $X_a$, the commitment stress value is a low value if assignment of the particular call is not committed to one of the technicians, or if assignment of the call is committed to the same technician to whom it is actually assigned. If assignment of the call is committed to a particular technician, but the present assignment of the call is to a different technician, the commitment stress value otherwise is a higher value, representing a higher degree of undesirability. The assigner module 22 determines the commitment value by reference to the call attributes of the particular call, as indicated it the call set data structure 28. Attention to the commitment stress value results in improved customer satisfaction and better management of future service calls in view of pending commitments.

The primary technician stress value pv encourages the A/S system 12 to assign a particular call, if possible, to a technician designated as the "primary technician" for the call. This stress value reflects the frequent designation of a primary technician where a customer representative model prevails in the field service environment of an organization. The primary service technician stress value pv is a low value if none of the service technicians is designated as a primary technician for a particular service call, or if the call is actually assigned to one of the technicians designated as the primary technician for the call. If a primary technician is designated, but the present assignment of the call is to a non-primary technician, the primary technician stress value pv is a higher value, representing a higher degree of undesirability. The assigner module 22 determines the primary technician for a particular call by reference to the call attributes stored in the call set data structure. This stress value tends to improve customer satisfaction, and provides a means for assigning a value to any other reasons an organization may have for designating a primary technician, such as unique characteristics making a technician most appropriate for a particular service call.

The territory stress value tv reflects the benefit of keeping technicians in their assigned service territories. This value tv is low if a location associated with a service call is within an acceptable travel time of the service territory of the technician to whom the call is assigned, but high if the location falls outside of an acceptable travel time of the technician's territory. The assigner module 22 compares the service territory of the technician to the location associated with a call by reference to both the technician attributes stored in the technician set data structure 28 and the call attributes stored in the call set data structure 30. Incorporation of the territory stress value tv in the stress function reduces unnecessary travel time for the technicians.

The skill stress value kv represents a number of skills, or resources, for which the technician to whom a call is assigned is qualified. The skills can be weighted to reflect relative values of individual skills such that the skill stress value kv represents a sum of the values. The purpose of the skill stress value kv is to retain the more broadly-trained technicians and technicians trained on higher-priority equipment "in reserve" if less broadly-trained technicians are available for the same service call. The assigner module 22 determines the skill stress value kv for a technician by reference to the technician attributes stored in the technician set data structure 28.

The depth stress value dv represents the number of levels generated in the search tree. This value penalizes prolonged searches, discouraging the continued search for nodes that produce only minimal improvements over nodes already obtained, and preventing excessive geographic spread. The assigner module 22 simply maintains a count of the number of levels generated in the search tree to determined the depth stress value dv.

The schedule stress value sv represents the degree of undesirability of the best schedule that can be generated for a particular technician. A schedule is a time-ordered sequence of the calls assigned to a technician. The "best" schedule is the particular sequence of calls producing the lowest schedule stress value. Estimation of the schedule stress value sv requires operation of the scheduler module 24.

The assigner module 22 invokes the scheduler module 24 during the search when a call is added to a technician's schedule by assignment of a new call or reassignment of a pending call, a call is removed from a technician's schedule by reassignment, or a request for further evaluation is received. Specifically, the assigner module 22 invokes the scheduler module 24 when the stress value of an assignment or reassignment is to be estimated, to thereby add the schedule stress value sv estimated by scheduler module 24 to the assignment stress calculation represented by equation (3). Each time the scheduler module 24 is invoked, the assigner module 22 passes a set of calls assigned to a technician who is affected by a particular assignment or reassignment, or is the subject of a request for further evaluation. The assigner module 22 also passes a set of call attributes with the calls, a set of technician attributes for the technician to whom the call is assigned, and a current time as determined by reference to the clock 32. The scheduler module 24 uses the call attributes, technician attributes, and current time in the schedule stress calculation, as will be described. The scheduler module 24 responds to the assigner module 22 by generating a plurality of potential schedules of the calls assigned to the particular technician, and then estimates the schedule stress value of each of the potential schedules. The scheduler module 24 selects the potential schedule having the lowest schedule stress value as the "best" schedule. The lowest schedule stress value then serves as the schedule stress value sv in the assignment stress calculation (3). In addition, the assigner module 22 adds the "best" schedule to the schedule set defining the particular node under evaluation.

The existing assignment set includes an existing schedule set that provides, for each of the technicians, an existing schedule of the pending calls assigned to the respective technician. As the search progresses, the assigner module 22 generates a schedule set for each of the first-level nodes and next-level nodes. Thus, the schedule set for each of the first-level nodes corresponds to the existing schedule set but includes a schedule of the new service call and the pending service calls assigned to the selected technician in the respective node. The schedule set for each of the next-level nodes corresponds to the preceding-level node from which the respective node stems, but includes schedules of the pending service calls assigned and reassigned to each of the service technicians involved in the respective reassignment. When the search process is terminated, the assigner module 22 adds to the new, recommended schedule set the resultant schedule set for the particular one of the nodes having the minimum assignment stress value.

For each of the first-level nodes, for example, the scheduler module 24 effectively modifies the existing schedule set by the addition of a new schedule, which replaces a previous schedule. The scheduler module 24 arrives at the new schedule by generating one or more potential schedules of the calls passed by assigner module 22 for the selected technician. The calls passed by assigner module 22 for a first-level node include the pending calls previously assigned to the selected technician and the new call added to the technician's schedule. The scheduler module 24 estimates a schedule stress value of each potential schedule to determine a relative degree of undesirability of the schedule. The scheduler module 24 then selects the potential schedule having the minimum schedule stress value as the best schedule for the selected technician, and returns the schedule and the minimum schedule stress value to the assigner module 22. The assignment stress value estimated by assigner module 22 for each of the first-level nodes then includes a representation of the minimum schedule stress value for the respective first-level node.

For each of the next-level nodes, the scheduler module 24 effectively modifies the schedule set of the preceding-level node by the addition of at least two new schedules, which replace two previous schedules. Each of the schedules provides a scheduling of the calls assigned or reassigned to one of the technicians involved in the reassignment. The first schedule adds a reassigned call, whereas the second schedule removes the same reassigned call. To arrive at the first and second schedules, the scheduler module 24 generates one or more first potential schedules of the calls assigned to a first technician involved in the reassignment, and one or more second potential schedules of the calls assigned to the second technician involved in the reassignment. The scheduler module 24 estimates, for each of the potential schedules, a schedule stress value, based on the same stress calculation used for each of the first-level nodes. The scheduler module 24 then selects the first potential schedule having a first minimum schedule stress value, and returns the selected schedule and its stress value to the assigner module 22. The scheduler module 24 similarly selects the second potential schedule having a second minimum schedule stress value, and returns the selected schedule and its stress value to the assigner module 22. Thus, the assignment stress value estimated for each of the next-level nodes includes a representation of the first minimum schedule stress value and the second minimum schedule stress value for the respective next-level node.

The estimation of the schedule stress value sv by scheduler module 24 will now be described in greater detail. The scheduler module 24 estimates the schedule stress value of a potential schedule by an objective function. The primary goal of the scheduler module 24 is to find a potential schedule that minimizes the overall schedule stress value $X_n$ of a schedule S for a particular technician, where the schedule stress value $X_n$ represents the sum of the stress values of the n service call assignments that make up the schedule S of the technician. The scheduler module 24 determines this overall schedule stress value $X_n$ by the function $$X_n = \sum_{a \in S} X_a \qquad (4)$$

where a represents an individual assignment of each of the service calls assigned to the technician. The schedule stress value $X_a$, for an individual assignment a is a function of when the assigned call is scheduled among the other calls assigned to the technicians. The scheduler module 24 calculates the schedule stress value for the individual assignment a based on a plurality of component schedule stress values associated with the assignment a, as represented by the schedule stress equation $$X_a = P_a U_a [\omega_\phi \phi_a + (1-C)\omega_N \lambda_a + C\omega_C \lambda_a] + \omega_\theta \theta_a \qquad (5)$$

where:

(1) $P_a$ is a priority value representing a relative priority of the respective service call of assignment a. This is a static value determined by a customer's contract with the service organization and possibly by the characteristics of the particular machine requiring repair services, as indicated by the attributes of the call.

(2) U, is an urgency value representing a relative urgency of the respective service call of assignment a. This value is a function of the seriousness of the problem and the impact of the problem on the customer's operations. For example, a service call involving a down machine that is holding up production and idling large numbers of personnel would have a higher urgency value than a call involving a routine repair. An indication of urgency can be added to the call attributes by the call taker or system user.

(3) $\phi_a$ is a queue time value representing a time interval elapsed between receipt of the respective service call of assignment a from the customer and a completion time of a preceding service call on the schedule. The scheduler module 24 determines the queue time by reference to the current time provided by clock 32 and passed by the assigner module 22.

(4) $\omega_\phi$ is a multiplier for the queue time value set by the field service organization.

(5) C is a schedule commitment value representing whether an arrival time has been promised to the customer. C is 1 if a start time is promised for the service call of assignment a, and is 0 otherwise. The commitment value is included in the call attributes passed by assigner module 22.

(6) $\lambda_a$ is a tardiness value for the call of assignment a. The tardiness values is 0 if the technician to whom the call is assigned is expected to arrive before a promised start time. Otherwise, the tardiness value represents a time interval between the promised start time for the respective service call and an expected start time for the service call. The scheduler module 24 determines the tardiness value by comparing the scheduled time for a call with the promised start time.

(7) $\omega_N$ is a multiplier for the tardiness value of uncommitted calls set by the field service organization.

(8) $\omega_C$ is a multiplier for the tardiness value of committed calls set by the field service organization.

(9) $\theta_a$ is the travel time value representing a time required by the technician to whom the respective service call of assignment a is assigned to travel to a location associated with the call from a preceding location. The scheduler module 24 may determine the travel time by reference to a travel time file listing estimated times for travel between specific locations. Alternatively, the scheduler module 22 may refer to postal zip codes for the locations associated with each call, as indicated in the call attributes, and calculate the travel time based on the distance between the centroids of the zip codes.

(10) $\omega_\theta$ is a multiplier for the travel time value set by the field service organization.

The technique by which the scheduler module 24 generates potential schedules will now be described in greater detail. Because the scheduler module 24 is repeatedly invoked by the assigner module 22 to evaluate assignments, its performance is one of the principle factors in the performance of the entire A/S system 12. Therefore, the amount of processing required for each scheduling operation should be kept to a minimum. In the absence of processing constraints, however, the potential schedules generated by scheduler module 24 could include an extremely high number of possible call sequences for a particular technician. For n number of calls assigned to the technician, the scheduler module 24 could generate n! different potential schedules in some cases. To reduce this combinatorial complexity, the scheduler module 24 employs a combination of pruning techniques to reduce the amount of processing required for each scheduling operation. Specifically, the scheduler module 24 employs a pair of pruning heuristics designed to completely avoid the necessity of a full-scale scheduling operation, and a third pruning heuristic designed to reduce the number of potential schedules generated during a scheduling operation. Thus, the scheduler module 24 generates an original potential schedule only as a last resort after application of the pruning heuristics.

The first and second pruning heuristics will be described with reference to FIGS. 6 and 7. The first pruning heuristic is herein referred to as "caching," whereby the scheduler module 24 avoids the redundant generation of potential schedules that have already been generated. In response to the addition of a call, the removal of a call, or a request for reevaluation, as indicated by block 140 in the flow diagram of FIG. 6, the scheduler module 24 must generate a least-stress schedule of the set of calls passed by assigner module 22 for a particular technician. Before generating any potential schedules, however, the scheduler module 24 searches a plurality of schedules stored, or "cached," in a schedule buffer associated with the scheduler module 24. The schedules stored in the schedule buffer represent "best" schedules generated in previous runs of the scheduler module 24. The schedule buffer stores each schedule with its corresponding schedule stress value, as determined previously by the scheduler module 24. The scheduler module 24 maintains the contents of the schedule buffer for a predetermined amount of time for future reference. The scheduler module 24 accesses the schedule buffer in an attempt to find a "non-obsolete," matching schedule previously generated for the same set of calls and the same technician passed by the assigner module 22, as indicated by block 142. A schedule is "non-obsolete" if a better schedule has not been generated in a subsequent run of the scheduler module 24, and if a significant amount of time has not passed. The matching schedule represents a time-ordered sequence for an identical assignment of calls to the same technician under evaluation. If a matching schedule is located, the scheduler module 24 simply selects that schedule as the best schedule for the particular technician and returns it to the assigner module 22 with the corresponding schedule stress value, as indicated by branch 144 and block 146. Thus, the caching technique avoids performing the same scheduling work more than once.

If the scheduler module 24 does not locate a matching schedule in the schedule buffer, the scheduling operation advances to the second pruning heuristic. The second pruning heuristic involves the calculation of a lower bound for the addition of a new call or a pending call to an original schedule having one or more calls. As indicated by block 148 of FIG. 6, the scheduler module 24 uses the lower bound to prune the schedules that are too expensive. Specifically, if the addition of the call produces a stress value that is greater than the lower bound, the particular node is deemed too expensive, and the scheduler module 24 notifies the assigner module 22 that the node should be discarded without further evaluation. The scheduler module 24 notifies the assigner module 22 by returning an indication that the scheduler module 24 failed to generate a schedule within acceptable stress limits, as indicated by branch 150 and block 154.

The assigner module 22 specifies a lower bound for the scheduler module 24 to ensure that schedules returned by the scheduler module 24 will not be pruned by the assigner module 22. The assigner module 22 estimates a worst acceptable schedule stress value $\psi_s$ based on the prevailing assignment stress threshold. The scheduler module 24 then estimates whether the stress of the schedule, as modified by the additional call, satisfies the worst acceptable schedule stress value $\psi_s$, without actually expending the processing time necessary to search for the best call sequence, and without considering travel time. The goal of the lower bound heuristic is to predict whether the assignment of a particular set of calls to a particular technician will have a minimum stress sequence with a schedule stress $X_n$ less than the worst acceptable schedule stress $\psi_s$. If not, the scheduler module 24 indicates to the assigner module 22 that the node is to be discarded to avoid the wasted processing time required for further expansion.

The scheduler module 24 first accesses the schedule buffer and references the original schedule for the technician under evaluation, as generated in the preceding-level node before the call was added. Based on the original schedule, the scheduler module 24 estimates the minimum stress of insertion of the additional call among the calls already on the schedule. The estimation indicates the minimum stress of the change to the original schedule. For example, FIG. 7 shows an original schedule defining a sequence $[A_0-A_n]$ of assignments for calls 1–n. The sequence $[N_0-N_n]$ represents the possible positions of insertion $N_i$ for an additional call N ahead of a call i in the sequence $[A_0-A_n]$. The assignment sequence $[B_1-B_{n+1}]$ represents an update of sequence $[A_0-A_n]$ indicating the updated assignment for call i when the additional call N is inserted ahead of call i. Given the framework shown in FIG. 7, the scheduler module 24 estimates the total stress of each possible insertion of call N in the assignment sequence $[A_0-A_n]$. Specifically, the scheduler module 24 calculates, for each possible insertion, the sum of the stress values of assignments $A_0-A_{i-1}$ up to the position of insertion $N_i$ of call N, the stress of the assignment of call N at position $N_i$, and the sum of the stress values of the assignments $B_{i+1}-B_{n+1}$ following the position of insertion $N_i$.

To calculate the stress of insertion, the scheduler module 24 first calculates a new tardiness value $\lambda_B$ for the resulting sequence $[A_0-A_{i-1}, N_i, B_{i+1}-B_{n+1}]$ as represented by the equation:

$$\lambda_{Ba}=\max(\phi_a+\theta_a+\Delta\phi_a-\epsilon_a, 0) \quad (6)$$

where $\phi_a+\theta_a$ represents the response time to the call N based on the times of the originally scheduled assignments $A_0-A_{i-1}$, and $\epsilon_a$ represents the expiration time of the call N based on an expected duration of the call, as indicated by the call attributes. The change in queue time $\Delta\phi_a$ of the call N reflects the queue time value as of the time the lower bound calculation is made. Because tardiness can never be negative, the change in the tardiness $\lambda_a$ in the schedule stress equation (5) can be represented as $$\Delta\lambda_a=\lambda_{Ba}-\lambda_{Aa} \quad (7)$$

where $\lambda_{Aa}$ represents the tardiness of the original sequence of assignments $[A_0-A_n]$.

Finally, for the lower bound, the scheduler module 24 calculates the incremental stress for assignment $B_{i+1}$ as the schedule stress value estimated by equation (5), but incorporating the change in tardiness and ignoring the travel time for assignment $N_i$. Thus, the incremental stress of insertion for assignment $N_{can}$ be represented by the modified schedule stress equation:

$$\Delta X_a=P_aU_a[\omega_\phi\Delta\phi_a+\Delta\lambda_a((1-C)\omega_N+C\omega_c)]. \quad (8)$$

The new stress $\beta_{Bn}$ of this assignment $B_N$ is then the sum of the stress $X_n$ of the original assignment $A_n$, and the incremental stress, as represented by:

$$X_{Bn}=X_{An}+\Delta X_n. \quad (9)$$

The scheduler module 24 then calculates the lower bound itself by the lower bound equation:

$$y = \min\left[\sum_{i=0}^{m} X_A^i + N_m + \sum_{j=m+1}^{n} X_B^j\right]. \quad (10)$$

If the lower bound y is not less than the worst acceptable schedule stress value $\psi_s$, the scheduler module 24 indicates to the assigner module 22 that the node is to be discarded. If the lower bound is satisfied, however, the scheduler module 24 advances to the next stage in the scheduling operation.

Figure 6:
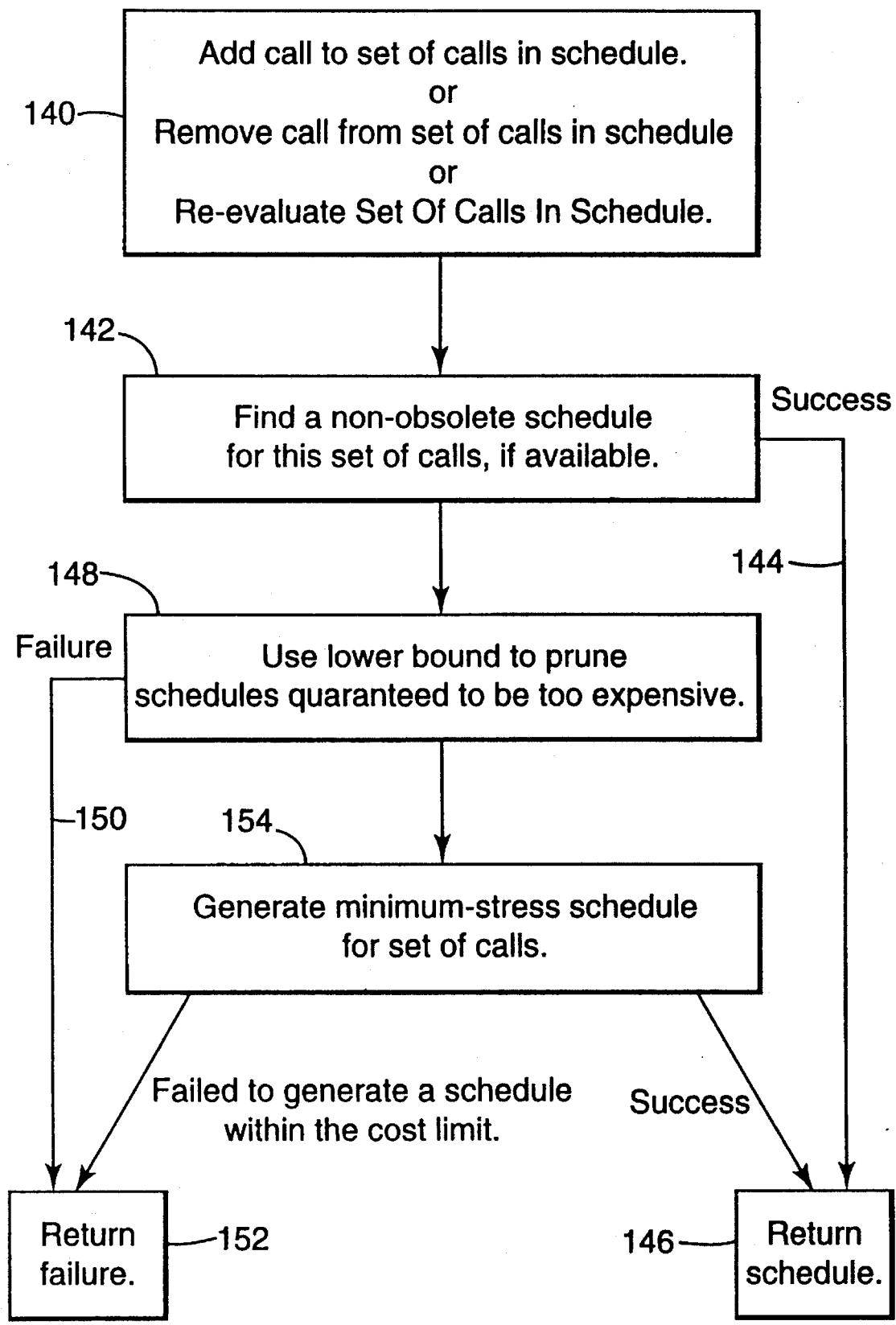
FIG. 6 is a flow diagram illustrating a scheduling mode of a system and method for assigning and scheduling resource requests in accordance with the present invention.
Figure 7:
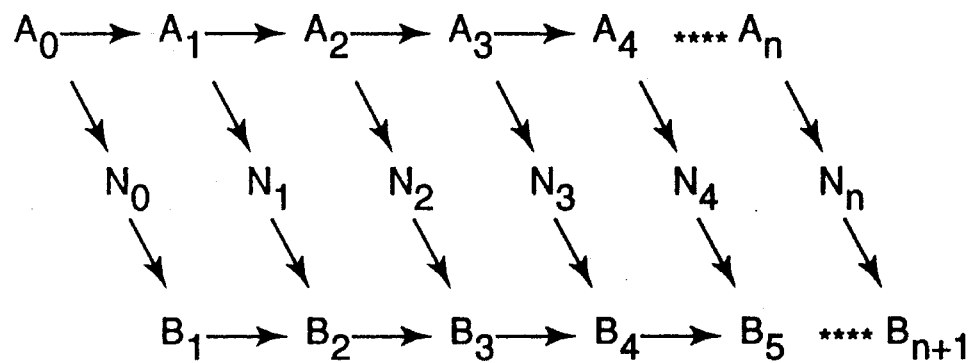
FIG. 7 is a scheduling diagram illustrating a lower bound calculation performed in the scheduling mode of a system and method for assigning and scheduling resource requests in accordance with the present invention.

If the caching technique does not produce a matching schedule, and the lower bound test is satisfied, the scheduler module 24 must produce a minimum stress schedule for the set of calls passed by the assigner module 22, as indicated by block 148 of FIG. 6. At this stage, however, the scheduler module 24 applies a third pruning heuristic to reduce the factorial complexity of the scheduling possibilities. Specifically, the scheduler module 24 employs a recursive "depth-first" schedule search technique in which one or more of the calls are prioritized as critical calls at each level of recursion. The scheduler module 24 recursively builds a sequence of the calls one-call-at-a-time, but prunes the number of possibilities at each level of recursion by considering placement of only the critical calls next in the schedule sequence. The pruning operation thereby eliminates the need to evaluate the placement of non-critical calls next in the sequence.

One example of a critical call is a committed call, where an arrival time has been promised to the customer. Because the committed call should not be scheduled later than the promised arrival time, it is designated a critical call that must be considered for placement next in the schedule sequence. Thus, initially the scheduler module 24 determines whether a call a is critical based on the definition $$\text{critical}=\{a|a \text{ has } C=1\} \quad (11)$$

where C=1 indicates that the call a has been committed. The critical status of a committed call is maintained The critical status of a committed call is maintained throughout the recursion by scheduler module 24.

If the definition yields critical=∅, however, the scheduler module 24 determines whether calls are critical based on their travel times $\theta_n$ from the particular technician's starting location and tardiness $\lambda_n$, as well as by their priorities $P_n$. At the root of each recursion, the technician's starting location is the technician's current location. As the recursion progresses to build a schedule sequence, however, the starting location is the location associated with the immediately preceding call in the sequence. This change in the starting location requires the recalculation of critical at each level of the recursion. Consequently, the calls designated as critical will change as the recursion progresses.

Each call is evaluated for critical based on the following tests:

(A) Location: Is the travel time less than or equal to the average travel time for this set of calls, $$\theta_a \leq \frac{\max(\theta_n) + \min(\theta_n)}{2} ?$$

(B) Tardiness: Is tardiness greater than or equal to the average tardiness for this set of calls, $$\lambda_a \geq \frac{\max(\lambda_n) + \min(\lambda_n)}{2} ?$$

(C) Priority: Is this a priority call, $$P_a < 0?$$

The scheduler module 24 creates the following partitions based on tests (A)–(C):

- $\alpha_3$: This partition contains the calls meeting all three tests (A)–(C);
- $\alpha_2$: If the number of calls in $\alpha_3 \geq \frac{1}{2}$ of the number of calls in this schedule, $\alpha_2 = \emptyset$; else, $\alpha_2$ contains all calls that meet any two of tests (A)–(C); and
- $\alpha_1$: If the number of calls in $\alpha_3 + \alpha_2 \geq \frac{1}{2}$ of the number of calls in this schedule, $\alpha_1 = \emptyset$, else $\alpha_1$ contains all calls that meet any of tests (A)–(C).

The set of critical calls is thus: critical=$\{\alpha_3 \cup \alpha_2 \cup \alpha_1\}$. The union ensures that a sufficient number of calls will be designated as critical calls at each stage of the recursion, while the partitions ensure that the number of critical calls is minimized.

Figure 8:
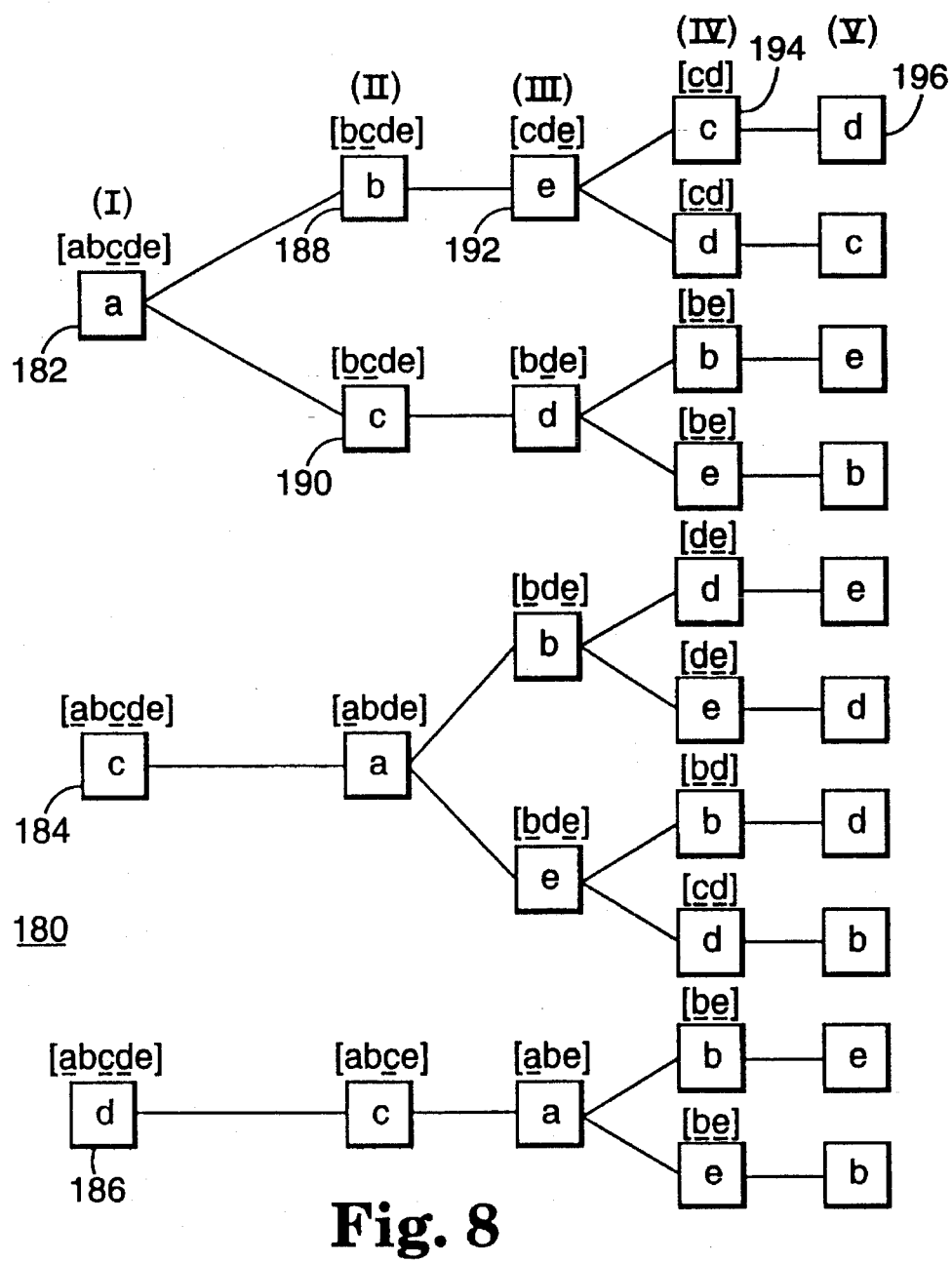
FIG. 8 is a search tree diagram illustrating a schedule sequence of resource requests for a particular resource provider in accordance with the present invention.

FIG. 8 shows a scheduling search tree 180, for purposes of illustrating the process by which the scheduler module 24 uses the critical calls to limit the recursion. In this example, the scheduler module 24 recursively minimizes the sequence of a set of calls [abcde] assigned to a particular technician. At level (I) of the search tree 180, all of the calls a, b, c, d, and e are available for scheduling, as indicated in brackets. However, it is assumed that calls a, c, and d are designated as belonging to the set of critical calls based on tests (A)–(C) above. Thus, level (I) shows each of the critical calls a, c, and d as a root node 182, 184, 186, respectively, of the scheduling search tree 180, because one of the critical calls must be scheduled first in the sequence. In FIG. 8, the critical calls at each level of the search tree 180 are denoted by an underline. The scheduler module 24 recursively builds the sequence of calls in a depth-first manner starting from each root node 182, 184, 186.

At level (II) of the search tree 180, the set of critical calls is recalculated under tests (A)–(C) based on the location, tardiness, and priority of each of the remaining calls on the schedule. For example, the remaining unscheduled calls after the scheduling of critical call a in root node 182 are calls b, c, d, and e, as indicated in brackets. If the scheduler module 24 determines that calls b and c satisfy tests (A)–(C) above, they are designated as critical calls. The scheduler module 24 then schedules one of the critical calls b and c next in the sequence, as indicated by nodes 188 and 190, respectively, which stem from root node 182. The scheduler module 24 continues to recursively expand the scheduling tree 180, recalculating critical calls from the remaining unscheduled calls at each level until, in the present example, five levels have been reached, corresponding to the scheduling of the set of five calls [abcde]. Thus, each of the potential schedules generated by the scheduler module 24 is a complete path, or "branch" of the search tree 180, from the root node at level (I) to the last node at level (V). For example, the path defined by node 182, 188, 192, 194, and 196 corresponds to the schedule sequence [abecd]. The complete expansion of a search tree for a set of five calls would yield 120 (5!) potential schedules. By designating critical calls at each level of recursion, however, the number of potential schedules generated by scheduler module 24 can be significantly reduced.

After generating a plurality of potential schedules, as shown in FIG. 8, the scheduler module 24 estimates the stress values of each schedule based on the schedule stress calculations (4) and (5), and selects the schedule having the minimum schedule stress value. The scheduler module 24 then compares the actual minimum schedule stress value to the worst acceptable schedule stress value $\psi_s$ specified by assigner module 22. If the minimum schedule stress value is less than the worst acceptable schedule stress value $\psi_s$, the scheduler module 24 returns the minimum schedule stress value to the assigner module 22 as schedule stress value sv, and returns the minimum stress schedule to the assigner module 22 as the best schedule for the set of calls, as indicated by block 146 of FIG. 6. If the minimum schedule stress value exceeds the worst acceptable schedule stress value $\psi_s$, however, the scheduler module 24 returns an indication that the scheduling operation failed to generate a schedule within acceptable cost limits, as indicated by block 152 of FIG. 6.

In addition to sequencing the calls assigned to a particular technician, the potential schedules generated by the scheduler module 24 also must fit the calls into time segments. The schedule stress calculation and the critical call determination depend heavily on the time at which a call is to be scheduled in the schedule sequence. Thus, when the scheduler module 24 selects one of the calls assigned to a technician to be placed next in the sequence of a potential schedule, it must also determine a start time and a completion time for that call. The process by which the scheduler module 24 fits the calls into time segments for a particular technician is dependent on the organizational calendar stored in calendar data structure 34, and the technician's calendar stored in the technician set data structure 28.

For example, the scheduler module 24 assigns a start time to the first call in the sequence of a potential schedule based on an estimated travel time from the technician's starting location to the location associated with the call, and assigns a completion time based on an estimated duration of the call. The estimated duration of a particular type of call may be specified by the system user and stored in a call duration file referenced by the scheduler module 24. The travel time between particular locations also may be specified by the system user and stored in a travel time file. The scheduler module 24 matches calls with estimated durations and travel times based on call attributes passed by the assigner module 22. The scheduler module 24 assigns a start time to the next call in the sequence based on the completion time of the preceding call and an estimated travel time between the preceding call and the next call. The completion time of the next call is then based on its estimated duration relative to its start time. The scheduler module 24 recursively builds the remainder of the sequence in the same manner by continuing to assign start times and completion times to later calls.

In assigning start and completion times, the scheduler module 24 must consider the available time segments specified by the organizational calendar stored in the calendar data structure 34 and the available time blocks specified by the technician calendar stored in the technician attributes passed by assigner module 22. The available time segments generally will correspond to a maximum of an entire work day, which may run, for example, from 8:00 to 17:00. The technician's calendar tracks appointments and other times unavailable for the scheduling of calls as fixed blocks of time at points during the time segment specified by the organizational calendar. The unavailable times are associated with locations that are used to calculate travel time between the appointment and service calls. The available time segments are hashed into time bins, with the beginning of each bin being either the start of the day, or the end of the previously scheduled call or unavailable time. The end of a time bin is then either the end of the same day, or the start of either the next scheduled call or an unavailable time. The scheduler module 24 caches the set of time bins for each technician to avoid regeneration at each level of the schedule search recursion.

Figure 9:
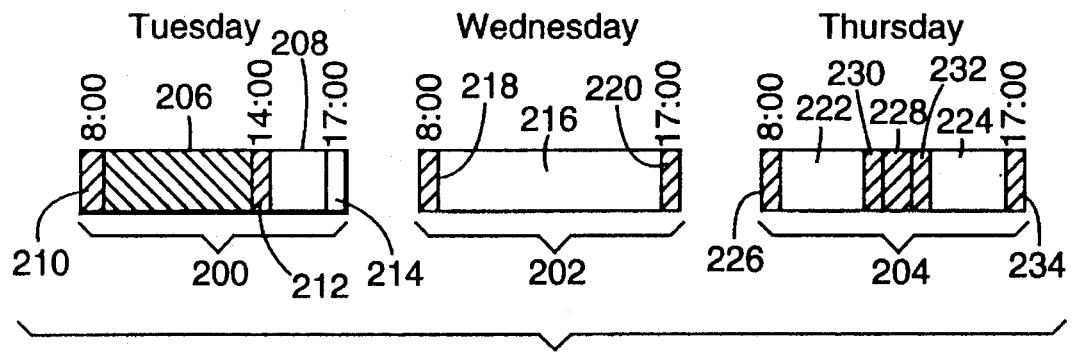
FIG. 9 is a scheduling calendar illustrating the scheduling of resource requests in accordance with the present invention.

FIG. 9 is an example of a technician's schedule divided into time segments and time bins. Each of the time segments 200, 202, 204 corresponds to an entire work day, Tuesday, Wednesday, Thursday, respectively. The first time segment 200, Tuesday, includes an unavailable block of time 206 from 08:00 to 14:00, and an available time bin 208 beginning at the end of block 206, plus travel time 212. Thus, the scheduler module 24 also considers travel times 210, 212, and 214 as part of the time segment 200. The time bin 208 ends at 17:00, the end of the time segment, minus the travel time 214. The Wednesday time segment 202 does not include any unavailable block of time, and therefore consists of a single time bin 216 spanning the entire work day, but bordered by travel times 218, 220. In contrast, the Thursday time segment 204 is hashed into two time bins 222, 224. The first time bin 222 begins at the beginning of the work day, 8:00, plus travel time 226, and ends at the beginning of an unavailable block of time 228, minus travel time 230. The second time bin 224 begins at the end of block 228, plus travel time 232, and runs through the end of the work day, 17:00, minus travel time 234.

When the scheduler module 24 selects a call to be next in the sequence of a potential schedule, it determines a start time for the call based on the following factors:

(1) a travel time $\theta_{n \to m}$ between locations associated with a preceding call n and the next call m to be scheduled, or between locations associated with the next call m and either a preceding block of unavailable time or the beginning of the time segment;

(2) a duration $\rho_m$ of the next call m to be scheduled based on an expected repair time of the machine associated with the call m; and (3) a length $\eta_{bin}$ of the time bin in which the next call m is to be scheduled.

Thus, to ensure that the duration of the next call m fits within the time bin, indicating available scheduling time, the scheduler module 24 schedules call m next in the sequence only if:

$$\theta_{n \to m} + \rho_m + \theta_{c \to ?} \leq \eta_{bin},$$

where $\theta_{c \to ?}$ represents the travel time between locations associated with the call m to be scheduled and the next call to be scheduled after call m.

Figure 10:
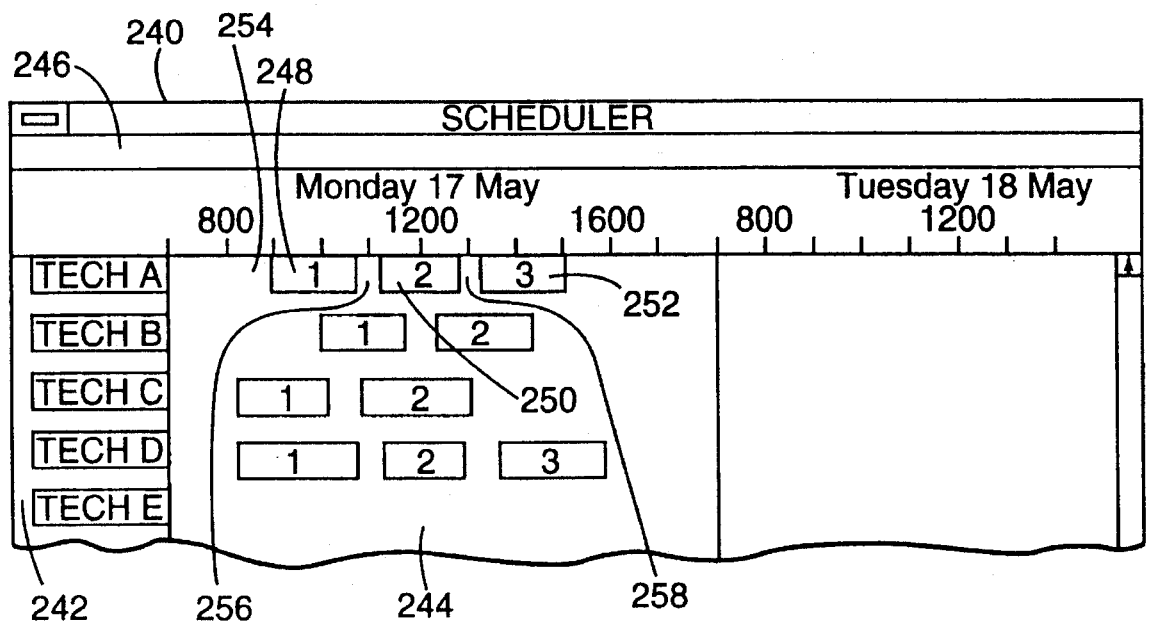
FIG. 10 is an example of a user interface displaying a set of schedules generated in accordance with the present invention.

FIG. 10 is an example of a graphical representation of a portion of the assignment set and schedule set generated by A/S system 12, as displayed to the system user by user interface 18. The user interface 18 preferably displays an interactive scheduler window 240 technician and the times at which the calls are scheduled. The scheduler window 240 includes a technician field 242 containing a representation of a particular group of technicians under evaluation by the system user, a schedule field 244 containing a representation of the calls assigned to each of the technicians and the particular times for which the calls are scheduled, and a command bar 246 containing representations of standard window control commands.

In FIG. 10, the technician field 242 displays a group of technicians A, B, C, D, and E operating in the field service environment. The schedule field 244 represents the existing schedules of the technicians, as generated by the scheduler module 24, subject to approval or modification by the system user. The schedule field 244 in FIG. 11 indicates that technician A has been assigned first, second, and third scheduled calls represented by call blocks 248, 250, and 252, which define assignments. The call blocks 248, 250, 252 represent scheduling of the calls between 9:00 and 15:00 in a time segment corresponding to Monday, May 17. Specifically, call blocks 248, 250, and 252 indicate assigned start times for the first, second, and third calls of approximately 9:00, 11:15, and 1:15, respectively. The completion times indicated by call blocks 248, 250, 252, respectively, are approximately 10:45, 12:45, and 2:45.

The schedule field 244 also includes time blocks 254, 256, 258 representing travel times. Time block 254 indicates the initial travel time, from the beginning of the day, required for the technician to travel from the starting location, or from a location associated with an otherwise unavailable time, to the customer location associated with the first call. Time blocks 256 and 258 represent the travel times that separate the start and completion times of the consecutively scheduled calls indicated by call blocks 238 and 240, and call blocks 240 indicated by call blocks 238 and 240, and call blocks 240 and 242, respectively. The time blocks 256, 258 represent the time required by the technician to travel from a customer location associated with the preceding call to a customer location associated with the next call.

Having described the exemplary embodiments of the invention, additional advantages and modifications will readily occur to those skilled in the art from consideration of the specification and practice of the invention disclosed herein. Therefore, the specification and examples should be considered exemplary only, with the true scope and spirit of the invention being indicated by the following claims.

What is claimed is:

1. A computer-implemented method for assigning a plurality of resource requests among a plurality of resource providers, said plurality of resource requests including a plurality of pending resource requests assigned among said resource providers according to an existing assignment set, wherein said existing assignment set defines a root node of a search tree, said method comprising the steps of:

(a) expanding said root node by forming one or more next-level nodes, each of said next-level nodes corresponding to said root node but being further defined by a reassignment of one of said pending resource requests between one of said resource providers and another of said resource providers;

(b) estimating, for each of said next-level nodes, a stress value representing a degree of undesirability of the respective reassignment; and (c) generating a new assignment set corresponding to one of said next-level nodes having a minimum stress value.

2. The method of claim 1, wherein each of said pending resource requests is a field service call, and each of said resource providers is a field service technician.

3. The method of claim 1, wherein said plurality of resource requests includes an unassigned new resource request, and said step (a) includes the steps of:

(a)(i) expanding said root node by forming one or more first-level nodes, each of said first-level nodes corresponding to said root node but being further defined by an assignment of said new resource request to a selected one of said resource providers;

(a)(ii) estimating, for each of said first-level nodes, a stress value representing a degree of undesirability of the respective assignment; and (a)(iii) expanding one or more of said first-level nodes by forming, for each of said first-level nodes, one or more of said next-level nodes, wherein each of said next-level nodes corresponds to the respective first-level node but is further defined by a reassignment of one of said pending resource requests between said selected one of said resource providers and another of said resource providers, wherein said new assignment set corresponds to one of said first-level nodes and said next-level nodes having a minimum stress value.

4. The method of claim 3, wherein said new resource request and each of said pending resource requests is a field service call, and each of said resource providers is a field service technician.

5. The method of claim 3, wherein said step (a)(iii) comprises the steps of:

selecting one of said first-level nodes having a minimum stress value; and expanding the selected one of said first-level nodes by forming one or more of said next-level nodes.

6. The method of claim 5, wherein said new resource request and each of said pending resource requests is a field service call, and each of said resource providers is a field service technician.

7. The method of claim 5, further comprising the steps of:

(d) selecting one of the unexpanded first-level nodes and the unexpanded next-level nodes having a minimum stress value;

(e) expanding the selected one of said unexpanded first-level nodes and said unexpanded next-level nodes as a preceding-level node by forming one or more next-level nodes, each of said next-level nodes corresponding to the preceding-level node but being further defined by a reassignment of one of said pending resource requests between one of said resource providers and another of said resource providers; and (f) estimating, for each of said next-level nodes formed by step (e), a stress value representing a degree of undesirability of the respective reassignment; and (g) repeating said steps (d), (e), and (f) to expand one of said unexpanded first-level nodes and said unexpanded next-level nodes as a preceding-level node, thereby forming a succession of said next-level nodes, wherein said new assignment set corresponds to one of said first-level nodes and said succession of said next-level nodes having a minimum stress value.

8. The method of claim 7, wherein said new resource request and each of said pending resource requests is a field service call, and each of said resource providers is a field service technician.

9. The method of claim 7, wherein said existing assignment set includes an existing schedule set, said existing schedule set including, for each of said resource providers, an existing schedule of the pending resource requests assigned to the respective resource provider, said method further comprising the steps of:

generating, for each of said first-level nodes, a schedule set corresponding to said existing schedule set but including a schedule of said new resource request and the pending resource requests assigned to said selected one of said resource providers; and generating, for each of said next-level nodes, a schedule set corresponding to the schedule set for the respective preceding-level node but including schedules of the resource requests assigned and reassigned to said one and said another of said resource providers, wherein said new assignment set includes the schedule set for the respective one of said first-level nodes and said next-level nodes having said minimum stress value.

10. The method of claim 9, wherein said step of generating a schedule set for each of said first-level nodes includes the steps of:

generating one or more potential schedules of said new resource request and the pending resource requests assigned to said selected one of said resource providers;

estimating, for each of said potential schedules, a schedule stress value representing a degree of undesirability of the respective potential schedule; and selecting one of said potential schedules having a minimum schedule stress value as said schedule for said selected one of said resource providers.

11. The method of claim 10, wherein said step of generating a schedule set for each of said next-level nodes includes the steps of:

generating one or more potential schedules, said potential schedules including one or more first potential schedules of the resource requests assigned to said one of said resource providers, and one or more second potential schedules of the resource requests assigned to said another of said resource providers;

estimating, for each of said potential schedules, a schedule stress value representing a degree of undesirability of the respective potential schedule; and selecting one of said first potential schedules having a first minimum schedule stress value as said schedule for said one of said resource providers, and one of said second potential schedules having a second minimum schedule stress value as said schedule for said another of said resource providers.

12. The method of claim 11, wherein said new resource request and each of said pending resource requests is a field service call, and each of said resource providers is a field service technician.

13. The method of claim 11, wherein, in said step (a)(ii), the stress value estimated for each of said first-level nodes includes a representation of said minimum schedule stress value for the respective first-level node, and, in said steps (b) and (f), the stress value estimated for each of said next-level nodes includes a representation of said first minimum schedule stress value and said second minimum schedule stress value for the respective next-level node.

14. The method of claim 13, wherein said new resource request and each of said pending resource requests is a field service call, and each of said resource providers is a field service technician.

15. The method of claim 11, further comprising the step of storing the schedule sets previously generated for said first-level nodes and said next-level nodes, wherein each of said steps of generating a schedule set for one of said first-level nodes and said next-level nodes includes the steps of:

before said step of generating said one or more potential schedules for a respective one of said resource providers, searching the stored schedule sets to locate a previous schedule for the resource requests to be schedule for the respective resource provider; and if a previous schedule for the resource requests to be scheduled for said respective resource provider is located, selecting said previous schedule as said schedule for said respective resource provider.

16. The method of claim 15, wherein said new resource request and each of said pending resource requests is a field service call, and each of said resource providers is a field service technician.

17. The method of claim 11, wherein said step of generating said one or more potential schedules for each of said first-level nodes includes, before generating said potential schedules, the steps of:

estimating a worst acceptable schedule stress value;

estimating, for each of said first-level nodes, a minimum stress of insertion of said new resource request among the pending resource requests on the existing schedule for said selected technician; and discarding each of said first-level nodes having a minimum stress of insertion that exceeds said worst acceptable schedule stress value.

18. The method of claim 17, wherein said new resource request and each of said pending resource requests is a field service call, and each of said resource providers is a field service technician.

19. The method of claim 11, wherein said step of generating said one or more first and second potential schedules for each of said next-level nodes includes, before generating said potential schedules, the steps of:

estimating a worst acceptable schedule stress value;

estimating, for each of said next-level nodes, a minimum stress of insertion of the pending resource request reassigned to one of said one and said another of said resource providers among the pending resource requests on the existing schedules for the respective one of said one and said another of said resource providers; and discarding each of said next-level nodes having a minimum stress of insertion that exceeds said worst acceptable schedule stress value.

20. The method of claim 19, wherein said new resource request and each of said pending resource requests is a field service call, and each of said resource providers is a field service technician.

21. The method of claim 11, wherein each of said steps of generating one or more potential schedules for each of said first-level nodes and said next-level nodes includes the steps of:

designating, for each of said potential schedules, a critical set of said resource requests assigned to the respective resource provider;

scheduling one of said resource requests in said critical set earlier than said resource requests not in said critical set; designating, after said scheduling of one of said resource requests in said critical set, a different critical set of said resources requests; and scheduling one of said resource requests in said different critical set earlier than said resource requests not in said different critical set.

22. The method of claim 21, wherein said new resource request and each of said pending resource requests is a field service call, and each of said resource providers is a field service technician.

23. The method of claim 11, wherein each of said steps of estimating a schedule stress value includes estimating the degree of undesirability of the respective potential schedule based on at least one of a plurality of component schedule stress values associated with each of the resource requests on said respective potential schedule, said component stress values including a priority value of the respective resource request, an urgency value of the respective resource request, a queue time value representing a time interval elapsed between receipt of the respective resource request and a completion time of a preceding one of said resource requests on the respective potential schedule, a tardiness value representing a time interval between a promised start time for the respective resource request and an expected start time for the respective resource request, and a travel time value representing a time required by the resource provider to whom said respective resource request is assigned to travel to a location associated with said respective resource request.

24. The method of claim 23, wherein said new resource request and each of said pending resource requests is a field service call, and each of said resource providers is a field service technician.

25. The method of claim 7, further comprising the step of generating, for each of said resource requests, a list of said resource providers qualified to accept assignment of the respective resource request, the resource providers on said list being designated as candidate resource providers for the respective resource request, wherein, in said step (a)(i), said selected one of said resource providers is a selected one of the candidate resource providers for said new resource request, and, in said step (e), each of said one and said another of said resource providers is one of the candidate resource providers for the respective reassigned pending resource request.

26. The method of claim 25, wherein each of the candidate resource providers qualified to accept assignment of a respective one of said new and pending resource requests is associated with a resource level appropriate for the respective resource request.

27. The method of claim 26, wherein said new resource request and each of said pending resource requests is a field service call, and each of said resource providers is a field service technician.

28. The method of claim 25, wherein each of the candidate resource providers qualified to accept assignment of a respective one of said new and pending resource requests is associated with a territory appropriate for the respective resource request.

29. The method of claim 28, wherein said new resource request and each of said pending resource requests is a field service call, and each of said resource providers is a field service technician.

30. The method of claim 25, wherein said step (a)(i) of forming one or more of said next-level nodes further comprises the steps of:

(A) forming one or more out-expanded next-level nodes corresponding to the respective first-level node but being further defined by a reassignment of one of said pending resource requests from said selected one of said resource providers to another of said resource providers; and (B) forming one or more in-expanded next-level nodes corresponding to the respective first-level node but being further defined by a reassignment of one of said pending resource requests to said selected one of said resource providers from another of said resource providers.

31. The method of claim 30, wherein said new resource request and each of said pending resource requests is a field service call, and each of said resource providers is a field service technician.

32. The method of claim 7, further comprising the step of terminating the repetition of said steps (d), (e), and (f) when none of said unexpanded first-level nodes and said unexpanded next-level nodes has a stress value less than a stress threshold.

33. The method of claim 32, wherein said stress threshold is a sum of a minimum stress value of said stress values for said first-level nodes and said next-level nodes and a stress margin, said stress threshold being recalculated with each repetition of said step (f).

34. The method of claim 33, wherein said new resource request and each of said pending resource requests is a field service call, and each of said resource providers is a field service technician.

35. The method of claim 7, further comprising the step of terminating the repetition of said steps (d), (e), and (f) when a number of levels formed of said next-level nodes exceeds a depth limit.

36. The method of claim 35, wherein said new resource request and each of said pending resource requests is a field service call, and each of said resource providers is a field service technician.

37. The method of claim 7, further comprising the step of terminating the repetition of said steps (d), (e), and (f) when a number of said first-level nodes and said next-level nodes exceeds a node-count limit.

38. The method of claim 37, wherein said new resource request and each of said pending resource requests is a field service call, and each of said resource providers is a field service technician.

39. The method of claim 7, further comprising the step of terminating the repetition of said steps (d), (e), and (f) when elapsed time during formation of said first-level nodes and said next-level nodes exceeds a time limit.

40. The method of claim 39, wherein said new resource request and each of said pending resource requests is a field service call, and each of said resource providers is a field service technician.

41. The method of claim 7, wherein said step (a)(ii) of estimating a stress value includes estimating the degree of undesirability of the respective assignment based on at least one of a plurality of component stress values associated with said respective assignment.

42. The method of claim 41, wherein said plurality of component stress values includes:

a commitment stress value, said commitment stress value being a low value if assignment of said respective new resource request is not committed to one of said resource providers or if assignment of said respective new resource request is committed to the resource provider to whom said respective new resource request is assigned, and said commitment stress value otherwise being higher than said low value;

a primary resource provider stress value, said primary resource provider stress value being a low value if none of said resource providers is designated as a primary resource provider for said respective new resource request or if said respective new resource request is assigned to one of said resource providers designated as the primary resource provider for said respective new resource request, and said primary resource provider stress value otherwise being higher than said low value; and a territory stress value, said territory stress value being a low value if a location associated with said respective new resource request is within an acceptable travel time of a territory of the resource provider to whom said respective new resource request is assigned, and said territory stress value otherwise being higher than said low value.

43. The method of claim 42, wherein said new resource request and each of said pending resource requests is a field service call, and each of said resource providers is a field service technician.

44. The method of claim 41, wherein said plurality of component stress values includes:

a resource stress value representing a number of resources for which the resource provider, to whom said respective new resource request is assigned, is qualified to provide.

45. The method of claim 44, wherein said new resource request and each of said pending resource requests is a field service call, and each of said resource providers is a field service technician.

46. The method of claim 7, wherein each of said steps (b) and (f) of estimating a stress value includes estimating the degree of undesirability of the respective reassignment based on at least one of a plurality of component stress values associated with said respective reassignment.

47. The method of claim 46, wherein said plurality of component stress values includes:

a commitment stress value, said commitment stress value being a low value if assignment of said respective pending resource request is not committed to one of said resource providers or if assignment of said respective pending resource request is committed to the resource provider to whom said respective pending resource request is reassigned, and said commitment stress value otherwise being higher than said low value;

a primary resource provider stress value, said primary resource provider stress value being a low value if none of said resource providers is designated as a primary resource provider for said respective pending resource request or if said respective pending resource request is reassigned to one of said resource providers designated as the primary resource provider for said respective pending resource request, and said primary resource provider stress value otherwise being higher than said low value; and a territory stress value, said territory stress value being a low value if a location associated with said respective pending resource request is within an acceptable travel time of a territory of the resource provider to whom said respective pending resource request is reassigned, and said territory stress value otherwise being higher than said low value.

48. The method of claim 47, wherein said new resource request and each of said pending resource requests is a field service call, and each of said resource providers is a field service technician.

49. The method of claim 46, wherein said plurality of component stress values includes:

a resource stress value representing a number of resources for which the resource provider, to whom said respective pending resource request is reassigned, is qualified to provide.

50. The method of claim 49, wherein said new resource request and each of said pending resource requests is a field service call, and each of said resource providers is a field service technician.

51. The method of claim 7, further comprising the step of displaying a representation of said new assignment set to a user for approval.

52. The method of claim 51, wherein said new resource request and each of said pending resource requests is a field service call, and each of said resource providers is a field service technician.

* * * * *

UNITED STATES PATENT AND TRADEMARK OFFICE
CERTIFICATE OF CORRECTION

PATENT NO. : 5,467,268
DATED : November 14, 1995
INVENTOR(S) : Sisley et al.

It is certified that error appears in the above-indentified patent and that said Letters Patent is hereby corrected as shown below:

Column 21, line 12, delete "U," and insert --$U_a$--.
Column 24, line 23, at the end of the formula, delete "$X_B{}^j$" and insert --$X^j{}_B$--.

Signed and Sealed this

Sixteenth Day of April, 199

BRUCE LEHMAN

Attest:

Attesting Officer

Commissioner of Patents and Trademarks